(12) United States Patent
Okuhara et al.

(10) Patent No.: US 10,000,174 B2
(45) Date of Patent: Jun. 19, 2018

(54) HEAD PROTECTION AIRBAG DEVICE

(71) Applicant: TOYODA GOSEI CO., LTD., Kiyosu-shi, Aichi-ken (JP)

(72) Inventors: Masaaki Okuhara, Kiyosu (JP); Koji Kawamura, Kiyosu (JP); Yuji Sato, Kiyosu (JP); Takuya Hiraiwa, Kiyuso (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days. days.

(21) Appl. No.: 15/263,429

(22) Filed: Sep. 13, 2016

(65) Prior Publication Data

US 2017/0088082 A1 Mar. 30, 2017

(30) Foreign Application Priority Data

Sep. 29, 2015 (JP) .................................. 2015-191986

(51) Int. Cl.
| | |
|---|---|
| *B60R 21/213* | (2011.01) |
| *B60R 21/231* | (2011.01) |
| *B60R 21/232* | (2011.01) |
| *B60R 21/00* | (2006.01) |

(52) U.S. Cl.
CPC .......... *B60R 21/213* (2013.01); *B60R 21/232* (2013.01); *B60R 21/23138* (2013.01); *B60R 2021/0048* (2013.01)

(58) Field of Classification Search
CPC . B60R 21/233; B60R 21/0136; B60R 21/232; B60R 21/213; B60R 21/23138; B60R 2021/0048; B60R 21/2342
See application file for complete search history.

(56) References Cited

U.S. PATENT DOCUMENTS

| | | | | |
|---|---|---|---|---|
| 6,065,772 A | * | 5/2000 | Yamamoto | B60R 21/207 |
| | | | | 280/730.2 |
| 6,073,960 A | * | 6/2000 | Viano | B60R 21/231 |
| | | | | 280/730.1 |
| 6,296,272 B1 | | 10/2001 | Heigl | |

(Continued)

FOREIGN PATENT DOCUMENTS

| | | |
|---|---|---|
| JP | 2001-505846 A | 5/2001 |
| JP | 2010-215096 A | 9/2010 |
| JP | 2012-201312 A | 10/2012 |

*Primary Examiner* — Paul N Dickson
*Assistant Examiner* — Timothy Wilhelm
(74) *Attorney, Agent, or Firm* — Posz Law Group, PLC

(57) ABSTRACT

In a head protection airbag device equipped with an airbag, a boundary closing portion is disposed between a main inflation portion and an end-side inflation portion of the airbag at the time of completion of inflation so as to partition the main inflation portion and the end-side inflation portion; the boundary closing portion is provided with a distribution port that is configured to allow the inflating gas from the main inflation portion to flow to the end-side inflation portion, between the upper edge and the lower edge of the peripheral portion; and the boundary closing portion is equipped with a vertical closing portion disposed along a substantially vertical direction on the lower side, and an inclined closing portion that extends in an obliquely upward direction of the main inflation portion from the vicinity of the upper end of the vertical closing portion.

9 Claims, 15 Drawing Sheets

(56) References Cited

U.S. PATENT DOCUMENTS

| | | | | |
|---|---|---|---|---|
| 6,312,010 | B1* | 11/2001 | Heigl | B60R 21/232 280/728.1 |
| 6,343,811 | B1* | 2/2002 | Hammer | B60R 21/232 280/730.2 |
| 6,565,118 | B2* | 5/2003 | Bakhsh | B60R 21/232 280/730.2 |
| 6,616,179 | B2* | 9/2003 | Tanase | B60R 21/232 280/730.2 |
| 6,851,706 | B2* | 2/2005 | Roberts | B60R 21/23138 280/730.1 |
| 7,264,267 | B2* | 9/2007 | Kino | B60R 21/232 280/728.2 |
| 7,278,655 | B2* | 10/2007 | Inoue | B60R 21/2342 280/730.2 |
| 7,278,659 | B2* | 10/2007 | Takahara | B60R 21/232 280/728.1 |
| 7,390,016 | B2* | 6/2008 | Noguchi | B60R 21/232 280/730.2 |
| 7,712,768 | B2* | 5/2010 | Fukuda | B60R 21/232 280/729 |
| 7,784,823 | B2* | 8/2010 | Heigl | B60R 21/213 280/730.2 |
| 7,988,187 | B2* | 8/2011 | Yamamura | B60R 21/232 280/730.2 |
| 8,282,124 | B2* | 10/2012 | Trovato | B60R 21/232 280/730.2 |
| 8,282,125 | B2* | 10/2012 | Pinsenschaum | B60R 21/232 280/730.2 |
| 8,608,193 | B1* | 12/2013 | Wysocki | B60R 21/233 280/730.2 |
| 8,622,420 | B2* | 1/2014 | Kato | B60R 21/0136 280/730.2 |
| 8,636,301 | B1* | 1/2014 | Wang | B60R 21/232 280/730.2 |
| 8,770,618 | B2* | 7/2014 | Fukawatase | B60R 21/232 280/729 |
| 8,851,508 | B1* | 10/2014 | Rickenbach | B60R 21/232 280/729 |
| 8,876,153 | B2* | 11/2014 | Dix | B60R 21/233 280/729 |
| 8,876,155 | B2* | 11/2014 | Nakashima | B60R 21/232 280/729 |
| 8,894,094 | B2* | 11/2014 | Wang | B60R 21/232 280/730.2 |
| 8,899,617 | B2* | 12/2014 | Fukawatase | B60R 21/232 280/730.2 |
| 8,967,660 | B2* | 3/2015 | Taguchi | B60R 21/233 280/729 |
| 9,067,562 | B2* | 6/2015 | Nakashima | B60R 21/232 |
| 9,067,563 | B2* | 6/2015 | Okuhara | B60R 21/2338 |
| 9,108,588 | B2* | 8/2015 | Fukawatase | B60R 21/233 |
| 9,114,776 | B2* | 8/2015 | Thomas | B60R 21/2338 |
| 9,114,777 | B2* | 8/2015 | Fukawatase | B60R 21/232 |
| 9,156,427 | B2* | 10/2015 | Wang | B60R 21/232 |
| 9,254,803 | B2* | 2/2016 | Park | B60R 21/0132 |
| 9,266,494 | B2* | 2/2016 | Wang | B60R 21/237 |
| 9,296,360 | B2* | 3/2016 | Komamura | B60R 21/276 |
| 9,539,978 | B2* | 1/2017 | Mazanek | B60R 21/232 |
| 9,610,916 | B2* | 4/2017 | Kawamura | B60R 21/232 |
| 2002/0180190 | A1* | 12/2002 | Tobe | B60R 21/232 280/730.2 |
| 2006/0131847 | A1* | 6/2006 | Sato | B60R 21/207 280/730.2 |
| 2007/0052212 | A1* | 3/2007 | Powals | B60R 21/232 280/729 |
| 2008/0079246 | A1* | 4/2008 | Dix | B60R 21/232 280/730.2 |
| 2008/0238055 | A1* | 10/2008 | Hotta | B60R 21/213 280/730.2 |
| 2009/0026742 | A1* | 1/2009 | Noguchi | B60R 21/232 280/730.2 |
| 2010/0013203 | A1* | 1/2010 | Mitchell | B60R 21/232 280/743.2 |
| 2012/0248751 | A1 | 10/2012 | Kato et al. | |
| 2014/0203541 | A1* | 7/2014 | Wei | B60R 21/213 280/730.2 |
| 2014/0217707 | A1* | 8/2014 | Konishi | B60R 21/213 280/728.2 |
| 2014/0239620 | A1* | 8/2014 | Kawamura | B60R 21/213 280/730.2 |
| 2015/0151708 | A1* | 6/2015 | Kawamura | B60R 21/232 280/728.2 |
| 2015/0166002 | A1* | 6/2015 | Fukawatase | B60R 21/233 280/730.1 |
| 2015/0307057 | A1* | 10/2015 | Moon | B60R 21/232 280/728.2 |

* cited by examiner

HEAD PROTECTION AIRBAG DEVICE

CROSS-REFERENCE TO RELATED APPLICATION(S)

This application is based upon and claims the benefit of priority from Japanese Patent Application No. 2015-191986, filed on Sep. 29, 2015, the entire contents of which are incorporated herein by reference.

BACKGROUND

1. Field of the Invention

The present invention relates to a head protection airbag device equipped with an airbag having a configuration that is stored in a folded state on an upper edge of a window (a side window) on a vehicle interior side of a vehicle side surface, and is deployed and inflated downward at the time of inflow of an inflating gas to cover the vehicle interior side of the window.

2. Description of the Related Art

In related art, as a head protection airbag device, an airbag has been configured to include a gas inflow portion capable of being inflated to separate a vehicle inner wall portion and a vehicle outer wall portion by introducing the inflating gas, and a non-inflow portion which does not introduce the inflating gas by coupling the vehicle inner wall portion and the vehicle outer wall portion (for example, see JP-A-2012-201312). The gas inflow portion includes, as an inflation part for introducing the inflating gas and inflating, a main inflation portion that covers a vehicle interior side of a window (a front side window), an end-side inflation portion which is disposed on a front end of an end portion in a front-rear direction of the airbag in adjacent to the main inflation portion and is disposed on the downstream side of the inflating gas from the main inflation portion, and a supply passage portion which is disposed atom the front-rear direction of the upper edge of the airbag to supply the inflating gas to the upper side of the main inflation portion. Further, the non-inflow portion includes a peripheral portion disposed on the peripheral edge of the gas inflow portion, a closing portion which is disposed to regulate the thickness of the inflation portion of the gas inflow portion or partition the inflating sit and a plurality of mounting pieces which are disposed to extend upward on the upper edge of the airbag and is mounted to the upper edge of the window.

In the airbag of the head protection airbag device, a boundary closing portion as the closing portion is disposed between the main inflation portion and the end-side inflation portion of the airbag at the time of completion of inflation so as to partition the main inflation portion and the end-side inflation portion, and the boundary closing portion is provided with a distribution port capable of allowing the inflating gas from the min inflation portion to flow to end-side inflation portion, between the upper edge and the lower edge of the peripheral portion (for example, see JP-T-2001-505846 and JP-A-2010-215096).

In the head protection airbag device in the related art, however, in a case where the airbag is configured that the main inflation portion and the end-side inflation portion are partitioned by the boundary closing portion, and the inflating gas from the main inflation portion via both sides of the upper and lower distribution ports of the boundary closing portion inflates the end-side inflation portion, the end-side inflation portion tends to complete the inflation later than the main inflation portion. When the end-side inflation portion completes deployment and inflation much later than the min inflation portion, at the time of oblique collision of the vehicle when the occupant moves in the vehicle exterior side direction obliquely forward of the vehicle, s not possible that the end-side inflation portion can properly hold the occupant. Additionally, when the end-side inflation portion completes deployment and inflation much later than the main inflation portion, there is a concern that, in the vehicle where a peripheral airbag such as a driver's seat airbag, a passenger's seat airbag, and the like is disposed and inflated on the vehicle interior side of the end-side inflation portion, due to the interference of the inflated peripheral airbag, the end-side inflation portion is not smoothly deployed and inflated to lower edge.

SUMMARY

The present invention has been made to solve the above-described problems, and it is desirable to provide a head protection airbag device capable of quickly completing the deployment and inflation of the end-side inflation portion of the airbag.

According to an aspect of the present invention, there is provided a head protection airbag device equipped with an airbag, the airbag being stored in a folded state on an upper edge of a window on a vehicle interior side of a vehicle side surface, and being deployed and inflated downward at the time of inflow of an inflating gas to cover the vehicle interior side of the window, wherein: the airbag is equipped with a gas inflow portion configured to be swelled to separate a vehicle inner wall portion and a vehicle outer wall portion by introducing the inflating gas, and a non-inflow portion which does not introduce the inflating gas by coupling the vehicle inner wall portion and the vehicle outer wall portion; the gas inflow portion is equipped with, as an inflation part for introducing the inflating gas and inflating, a main inflation portion that covers the vehicle interior side of the window, an end-side inflation portion which is disposed at an end portion in a front-rear direction of the airbag in adjacent to the main inflation portion and is disposed on a downstream side of the inflating gas from the main inflation portion, and a supply passage portion which is disposed along the front-rear direction of an upper edge of the airbag to supply the inflating gas to an upper side of the main inflation portion; the non-inflow portion is equipped with a peripheral portion disposed on a peripheral edge of the gas inflow portion, a closing portion which is disposed to regulate the thickness of the inflation portion of the gas inflow portion or partition the inflating site, and a plurality of mounting piece portions which are disposed to extend upward on the upper edge of the airbag and is mounted to the upper edge of the window; a boundary closing portion as the closing portion is disposed between the main inflation portion and the end-side inflation portion of the airbag at the time of completion of inflation so as to partition the main inflation portion and the end-side inflation portion; the boundary closing portion is provided with a distribution port that is configured to allow the inflating gas from the main inflation portion to flow to the end-side inflation portion, between the upper edge and the lower edge of the peripheral portion; and the boundary closing portion is equipped with a vertical closing portion disposed along a substantially vertical direction on the lower side, and an inclined closing portion that extends in an obliquely upward direction of the main inflation portion from the vicinity of the upper end of the vertical closing portion.

In the head protection airbag device according to the present invention, when the inflating gas is supplied to the airbag, the inflating gas flows to the upper side of the main inflation portion from the supply passage portion, and flows into the end-side inflation portion via the upper and lower distribution portions of the boundary closing portion. Thus, the main inflation portion and the end-side inflation portion are deployed and inflated to complete the inflation.

At that time, the inflating gas that has flowed into the upper side of the main inflation portion from the supply passage portion inflates the main inflation portion, and flows to the end-side inflation portion on the upper side of the main inflation portion. And, in the inflating gas that has flowed to the end-side inflation portion on the upper side of the main inflation portion, the inflating gas that does not hit the inclined closing portion of the upper side of the boundary closing portion flows into the upper side of the end-side inflation portion, as it is, via the upper distribution portion, thereby deploying and inflating the end-side inflation portion. Further, in the inflating gas that has flowed to the end-side inflation portion on the upper side of the main inflation portion, the inflating gas that hits the inclined closing portion of the upper side of the boundary closing portion is guided to the edge of the inclined closing portion on the main inflation portion, changes the flow downward, and the inflating gas flows to the lower edge of the main inflation portion via the edge of the vertical closing portion on the main inflation portion. Then, the inflating gas that has flowed to the lower edge of the main inflation portion along the vertical closing portion flows into the upper side of the main inflation portion so as to deploy and inflate the main inflation portion via the supply passage portion and is joined with the inflating gas toward the lower part, flows into the lower side of the end-side inflation portion via the lower distribution port to inflate the end-side inflation portion.

That is, the inclined closing portion of the upper side of the boundary closing portion divides the inflating gas flowing to the end-side inflation portion from the supply passage portion into a part flowing into the upper side of the end-side inflation portion from the upper distribution port, and a port flowing into the lower side of the end-side inflation portion from the lower distribution port. When flowing into the end-side inflation portion from the lower distribution port, by merging the inflating gas which deploys and inflates the main inflation portion, it is possible to bring a completion timing of the deployment and inflation of the end-side inflation portion, by inflating gas flowing from the upper and lower distribution ports while being joined, closer to a completion timing of the deployment and inflation of the main inflation portion as much as possible.

Accordingly, in the head protection airbag device according to the present invention, it is possible to quickly complete the deployment and inflation of the end-side inflation portion of the airbag. Therefore, in the head protection airbag device according to the present invention, it is possible to accurately protect the occupant at the time of oblique collision of the vehicle by the quickly inflated end-side inflation portion of the e airbag, and it is possible to smoothly arrange the deployed and inflated end-side inflation portion on the side of the surrounding airbag.

In the head protection airbag device according to the present invention, the boundary closing portion of the airbag may integrally and continuously dispose the vertical closing portion and the inclined closing portion.

In such a configuration, since the vertical closing portion and the inclined closing portion of the boundary closing portion are continuously continued, as compared with a case of providing an area having no closing portion between the vertical closing portion and the inclined closing portion, total amount of the inflating gas guided to the edge of the main inflation portion of the inclined closing portion can be allowed to smoothly flow to the lower distribution port, which can accurately contribute to completion of the inflation of the end-side inflation portion.

In the head protection airbag device according to the present invention, the boundary closing portion of the airbag may be configured to have a shape such that, as the edge of the main inflation portion, the edge of the vertical closing portion extends in a vertical direction and the edge of the inclined closing portion extends in the front-rear direction.

In such a configuration, an upper corner of the main inflation portion on side defined by the boundary closing portion is configured to form a corner portion of substantially 90 degrees, the width dimensions in both directions of the front-rear direction and the vertical direction of the main inflation portion are widened to expand the capacity of the main inflation portion, and the main inflation portion when inflated can be thickly swelled, which can contribute to improving the occupant protection performance.

In the head protection airbag device according to the present invention, the folded shape of the end-side inflation portion to the upper edge of the window in the airbag may be set to a folded shape in a state in which a fold is provided in the vertical closing portion of the boundary closing portion or in the end-side inflation portion in the vicinity of the vertical closing portion, the end-side inflation portion may be folded to the side of the vehicle inner wall portion of the main inflation portion, and the lower edge of the airbag may be brought close to the upper edge, a mounting piece portion, provided on the end portion of the end-side inflation portion on the upper edge of the airbag, may be disposed in a just upper area of the vertical closing portion, or near the boundary closing portion of the main inflation portion direction from the just upper area, so as to form the fold in the folded shape, the mounting piece portion may be attachably disposed in a roof side rail portion of the vehicle; a vertical length dimension of the mounting piece portion may be formed to be longer than other mounting piece portions, and the end-side inflation portion of the inflated airbag may be disposed to cover the vehicle interior side of a pillar portion which extends from the roof side rail portion and is connected to the lower edge of the window.

In such a configuration, because the end-side inflation portion of the airbag is stored by being folded to the roof side rail portion of the vehicle rather than the pillar portion of the vehicle, even when there is no space inside the pillar portion, the airbag can be easily folded and stored on the upper edge of the window. Furthermore, since the vertical length of the end-side mounting piece portion is longer than the other mounting piece portion, even in a configuration in which the end-side inflation portion completes the deployment and inflation to cover the vehicle interior side of the pillar portion, it is possible to arrange the upper side of the end-side inflation portion on the vehicle interior side of the roof side rail portion and the pillar portion, through the lower edge of the airbag cover such as a roof head lining of the roof side rail portion, and it is possible to widely ensure protection area of the occupant of the end-side inflation portion.

In the above configuration, even if the end-side inflation portion is folded back into the main inflation portion, initially when the inflating gas flows into the end-side inflation portion, as long as having a folded shape in which the lower edge of the airbag is brought close to the upper edge, the inflating gas flows from the upper distribution port, and that time, at the boundary closing portion, by the fold which folds the end-side inflation portion on the main inflation portion, the inclined closing portion of the upper side of the vertical closing portion is disposed on the main inflation portion, and is disposed to extend obliquely upward on the main inflation portion. That is, above the inclined closing portion of the main inflation portion than the fold that folds the end-side inflation portion on the main inflation portion, the deployment inflation portion that expands from the communication port to the end-side inflation portion is disposed. Therefore, initially when the inflating gas flows into the end-side inflation portion, the inflating gas flows into the deployment inflation portion from the upper distribution port, thereby making the end-side inflation portion folded toward the vehicle inner wall portion of the main inflation portion in a state of being pushed in the vehicle interior direction by inflation of the deployment inflation portion disposed on the vehicle exterior side. As a result, the end-side inflation portion folded over the main inflation portion can quickly eliminate the fold, can be deployed so as to be continuous to a planar shape from the main inflation portion, and can the subsequent rapid deployment and inflation.

In the head protection airbag device according to the present invention, the airbag may connect the side of the vehicle outer wall portion of the boundary closing portion at the time of completion of inflation and the part of the pillar portion, to exert tension to the lower edge at the time of completion of inflation of the airbag along the front-rear direction; and the airbag may include a tension cloth configured to support the vehicle exterior side of the end-side inflation portion is disposed.

In such a configuration, when the airbag is completely inflated, by the tension cloth, the tension along the front-rear direction is generated on the lower edge of the airbag, the main inflation portion and the end-side inflation portion is restricted from moving in the vehicle exterior direction, and it is possible to appropriately hold the occupant. In addition, the tension cloth can project the end-side inflation portion to the vehicle interior side from the main inflation portion so as to support the end-side inflation portion on the vehicle exterior side, it is possible to stably hold the occupant who moves to the end-side inflation portion along the front-rear direction by the end-side inflation portion protruding to the vehicle interior side, thereby improving the occupant protection performance in the airbag.

The end-side inflation portion, at the time of completion of inflation of the airbag, may include an extending portion which extends below a belt line of the lower edge of the window of the vehicle and may be supported on the lower edge of the window.

In such a configuration, when the airbag is completely inflated, the extending portion of the end-side inflation portion is supported by the lower edge of the window in the vehicle interior side, thereby preventing the lower edge of the airbag from moving to the vehicle exterior side beyond the window. Accordingly, it is possible to restrain the occupant on the vehicle interior side by the airbag, and even at the time of roll-over of the vehicle, it is possible to suitably protect the occupant.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
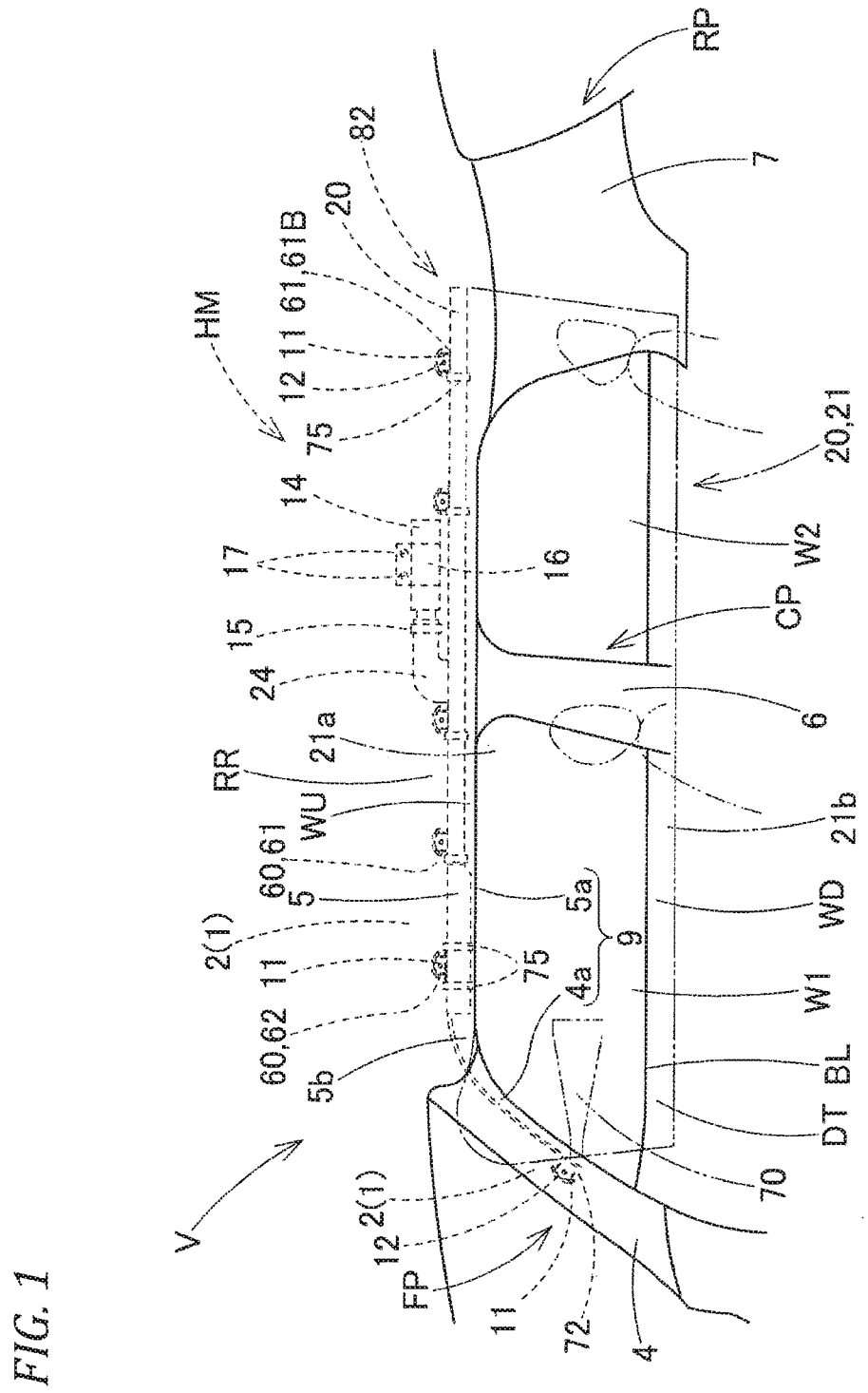
FIG. 1 is a schematic front view in which a head protection airbag device according to an embodiment of the present invention is viewed from the vehicle interior side.

Hereinafter, an embodiment of the present invention will be described with reference to the drawings. As illustrated in FIG. 1, a head protection airbag device HM of the embodiment is mounted on a vehicle V of double seat type having two windows (side windows) W1 and W2. The head protection airbag device HM of the embodiment is configured to include, as illustrated in FIG. 1, an airbag 20, an inflator 14, mounting brackets 11 and 16, and an airbag cover 9. As illustrated in FIG. 1, the airbag 20 is stored by being folded from the lower edge of a front pillar portion FP to an upper region of a rear pillar portion RP via a lower edge of a roof side rail portion RR on the upper edge of the windows W1 and W2 on the vehicle interior side of the vehicle V.

As illustrated in FIGS. 1 and 9 to 14, the airbag cover 9 is constituted by each of lower edges 4a and 5a of a front pillar garnish 4 disposed in the front pillar portion FP, and a roof head lining 5 disposed in the roof side rail portion RR. The front pillar garnish 4 and the roof head lining 5 are made of synthetic resin, and are mounted and fixed to a vehicle interior side I of an inner panel 2 of a body (vehicle body) 1 in front pillar portion FP and the roof side rail portion RR, respectively. Further, the airbag cover 9 covers the folded and stored vehicle interior side I of the airbag 20, and in order to allow the airbag 20 during deployment and inflation to protrude downward to the vehicle interior side, the airbag cover 9 is configured by being pushed by the airbag to be able to open to the vehicle interior side I (see FIGS. 9 to 14).

The inflator 14 supplies the inflating gas to the airbag 20, as illustrated in FIG. 1, and as a substantially cylindrical cylinder type, on the tip end, a gas discharge port (not illustrated) capable of discharging the inflating gas is disposed. The inflator 14 is connected to the airbag 20, using a clamp 15 disposed on the outer peripheral side of the connection port portion 24, by inserting the tip end including the vicinity of the gas discharge port into the connection port portion 24 described later of the airbag 20. Further, the inflator 14 is mounted at a upper position of the window W2 in the inner panel 2, using a mounting bracket 16 for holding the inflator 14, and a bolt 17 for fixing the mounting bracket 16 on the inner panel 2 of the body 1 (see FIG. 1). The inflator 14 is electrically connected to a control unit (not illustrated) of the vehicle V via a lead wire (not illustrated), and when the control unit detects a side collision or an oblique collision and a roll-over of the vehicle V, the inflator 14 is configured to operate by input an operation signal from the control unit.

Figure 12:
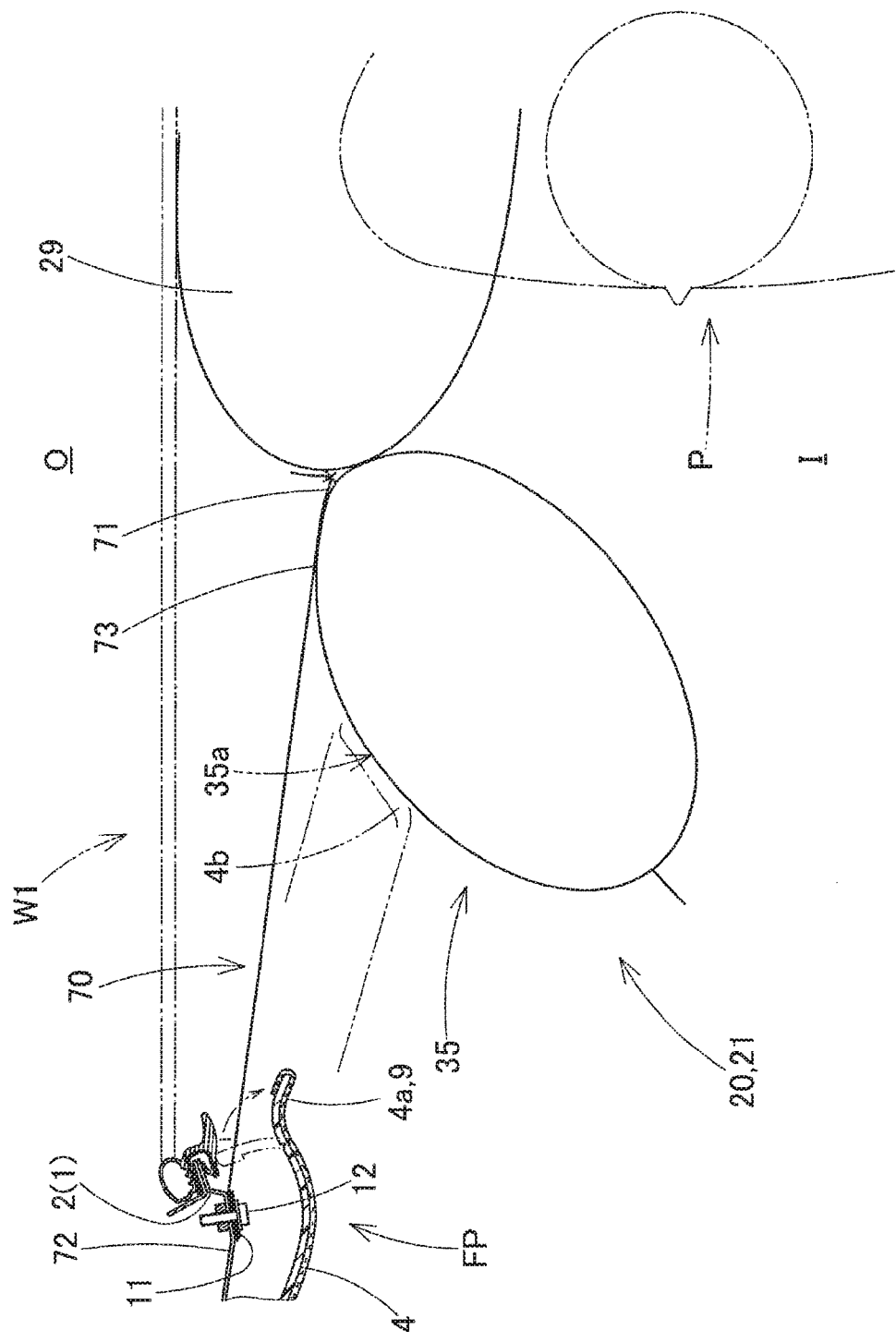
FIG. 12 is a partially enlarged schematic horizontal cross-sectional view along the front-rear direction illustrating a state in which the airbag is completely inflated in the head protection airbag device of the embodiment.
Figure 13:
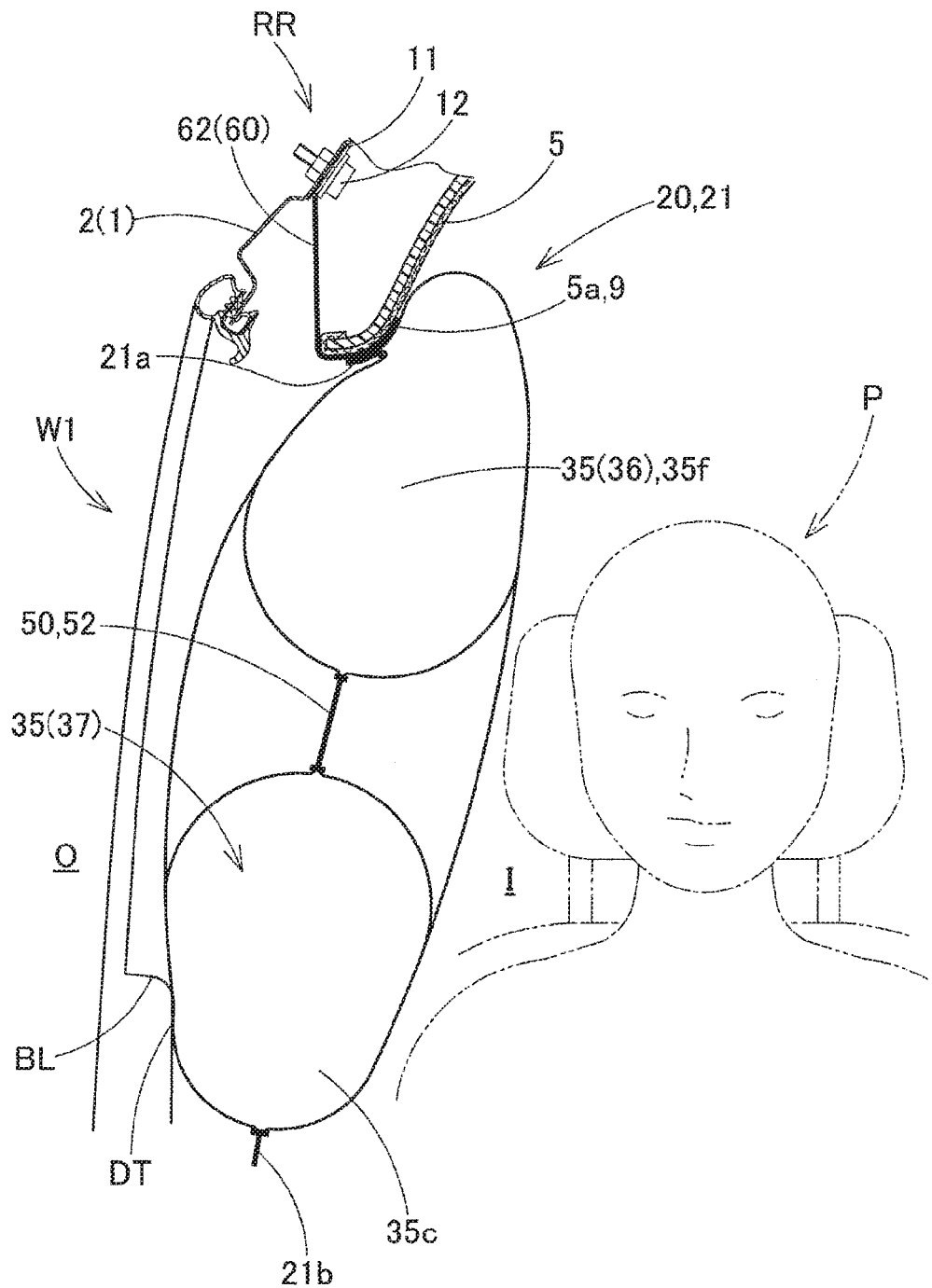
FIG. 13 is a schematic vertical cross-sectional view along the vertical direction illustrating a state in which the airbag is completely inflated in the head protection airbag device of the embodiment, corresponding to the part XIII-XIII in Section B of FIG. 10.

Each mounting bracket 11 is made up of two sheet metal plates, interposes each of the mounting piece portions 60 (a typical mounting piece portion 61, and an end-side mounting piece portion 62) to be described later of airbag 20 and the mounting portion 72 from front and back, is mounted on the mounting piece portion 60 and the mounting portion 72, and mounts and fixes the mounting piece portion 60 and the mounting portion 72 to the inner panel 2 of the body 1 using the bolts 12 (see FIGS. 12 to 14).

As illustrated in FIGS. 2 to 6, the airbag 20 includes a bag body 21, a mounting piece portion 60 for fixing the upper edge 21a of the bag body 21 to the inner panel 2 of the body 1, and a tension cloth 70 which fixes a tip end (mounting portion 72) extending from one end (the front end 21c in the case of the embodiment) in the front-rear direction of the bag body 21 to the inner panel 2 of the front pillar portion FP.

Figure 2:
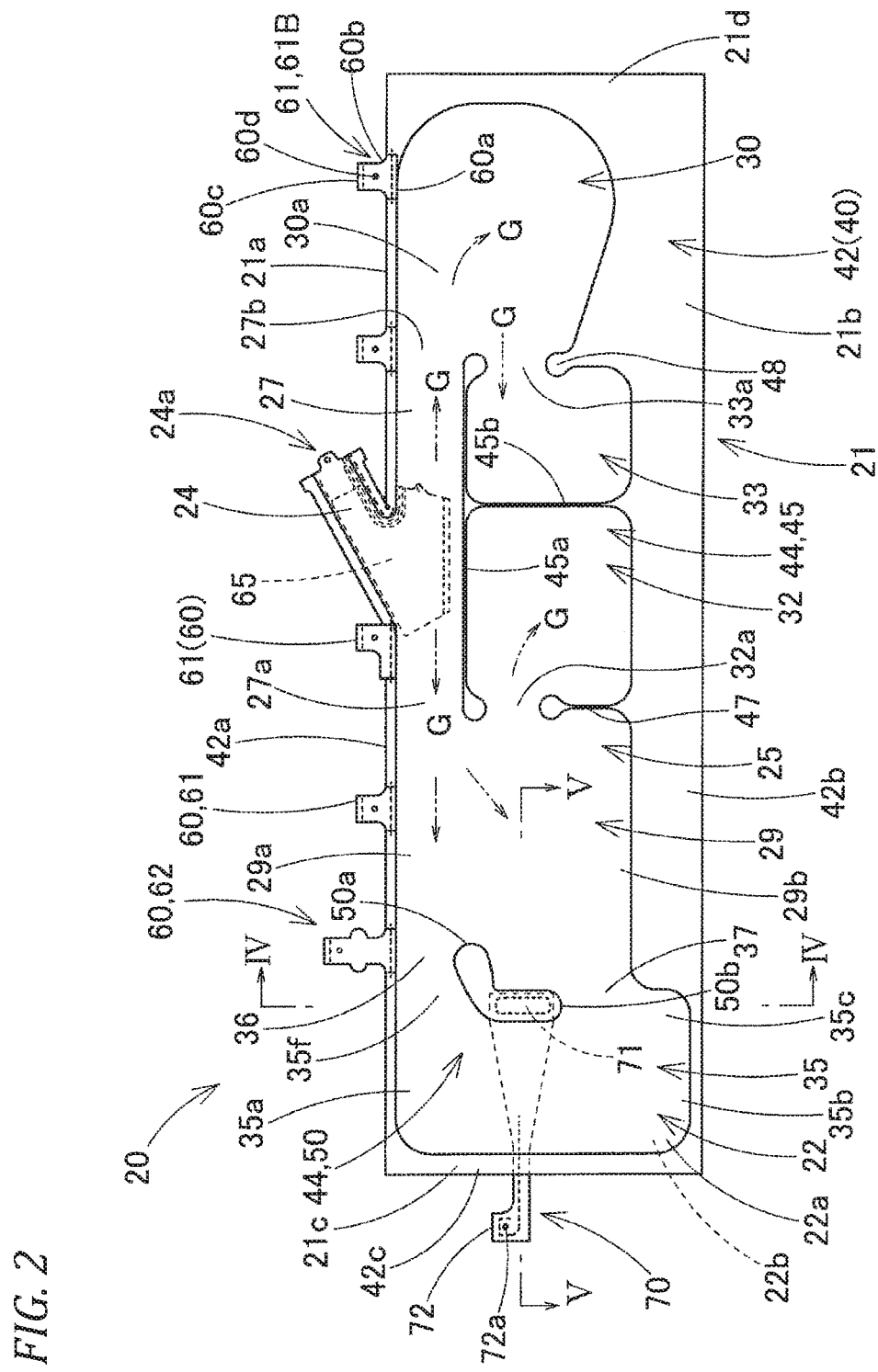
FIG. 2 is a front view illustrating an airbag used in the head protection airbag device according to the embodiment in a flat-deployed state.
Figure 6:
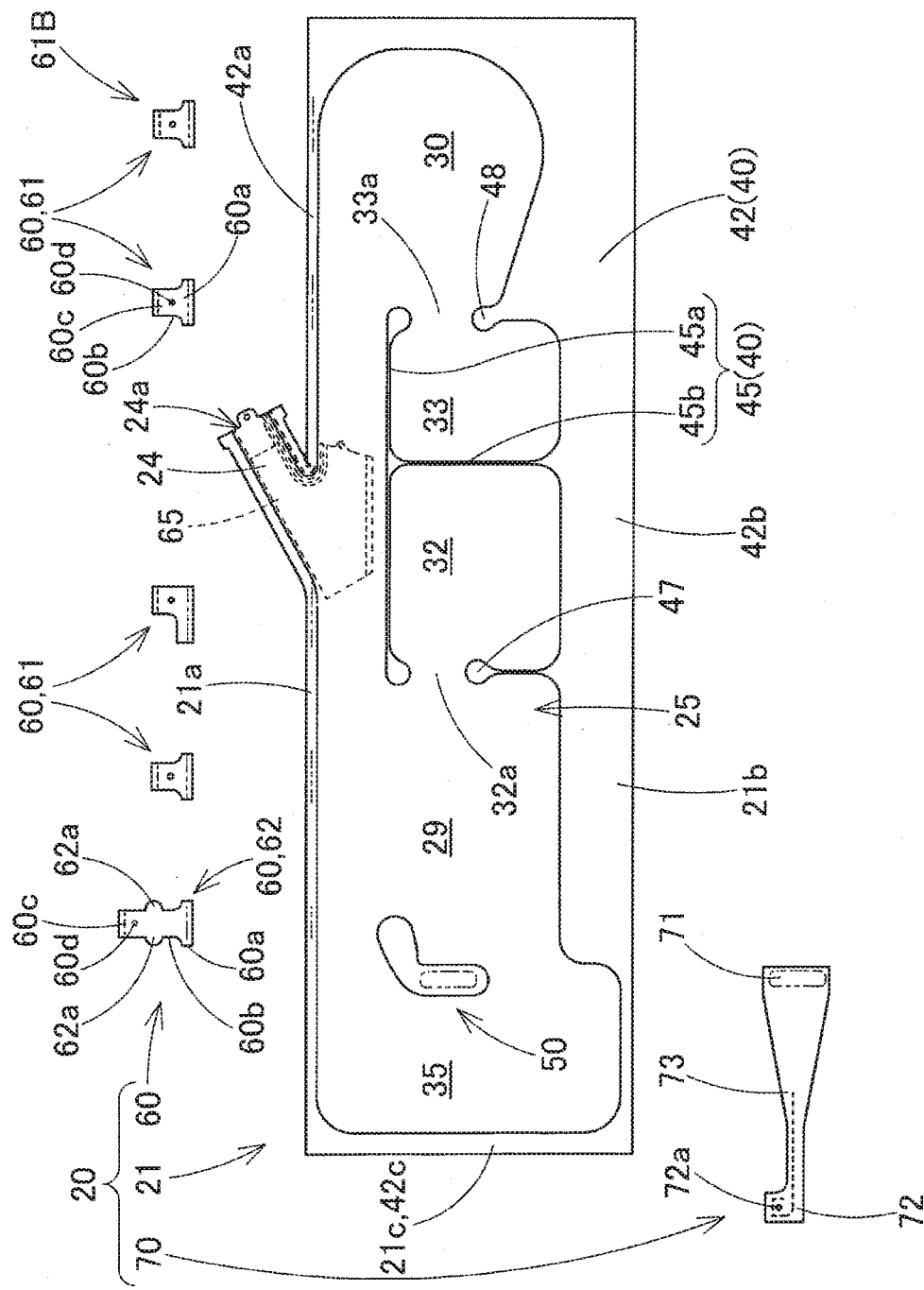
FIG. 6 is a front view of a mounting piece portion, a bag body, and a tension cloth constituting the airbag of the embodiment.
Figure 11:
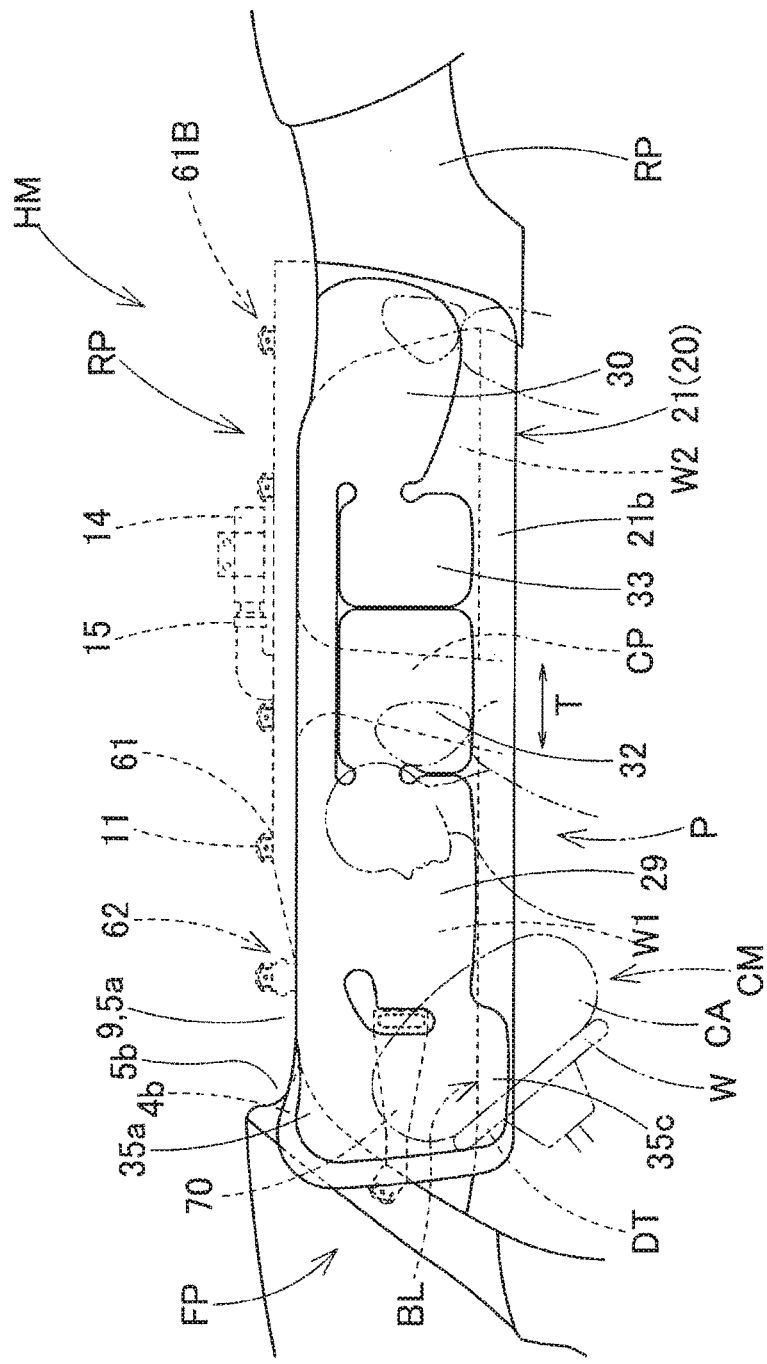
FIG. 11 is a schematic front view in which the inflated state of the airbag of the embodiment is viewed from the vehicle interior side.

As illustrated in the chain double-dashed line of FIG. 1 and FIG. 11, the bag body 21 is configured to introduce the inflating gas from the inflator 14 therein, deploy from the folded state, and cover the windows W1 and W2 and the vehicle interior side I of the pillar garnishes 4, 6 and 7 of each pillar portion FP, CP and RP, and the outer shape is a substantially rectangular plate shape in which a longitudinal direction extends substantially in the front-rear direction so as to be able to cover the vehicle interior side from the window W1 via the center pillar portion CP and the window W2 to front side of the rear pillar portion RP when completely inflated (see FIGS. 2 and 6). Further, as illustrated in FIGS. 2 and 11, the bag body 21 sets the upper and lower width dimensions, such that the lower edge 21b when completely inflated is positioned below the belt line BL constituted from the lower edges of the windows W1 and W2.

Figure 4:
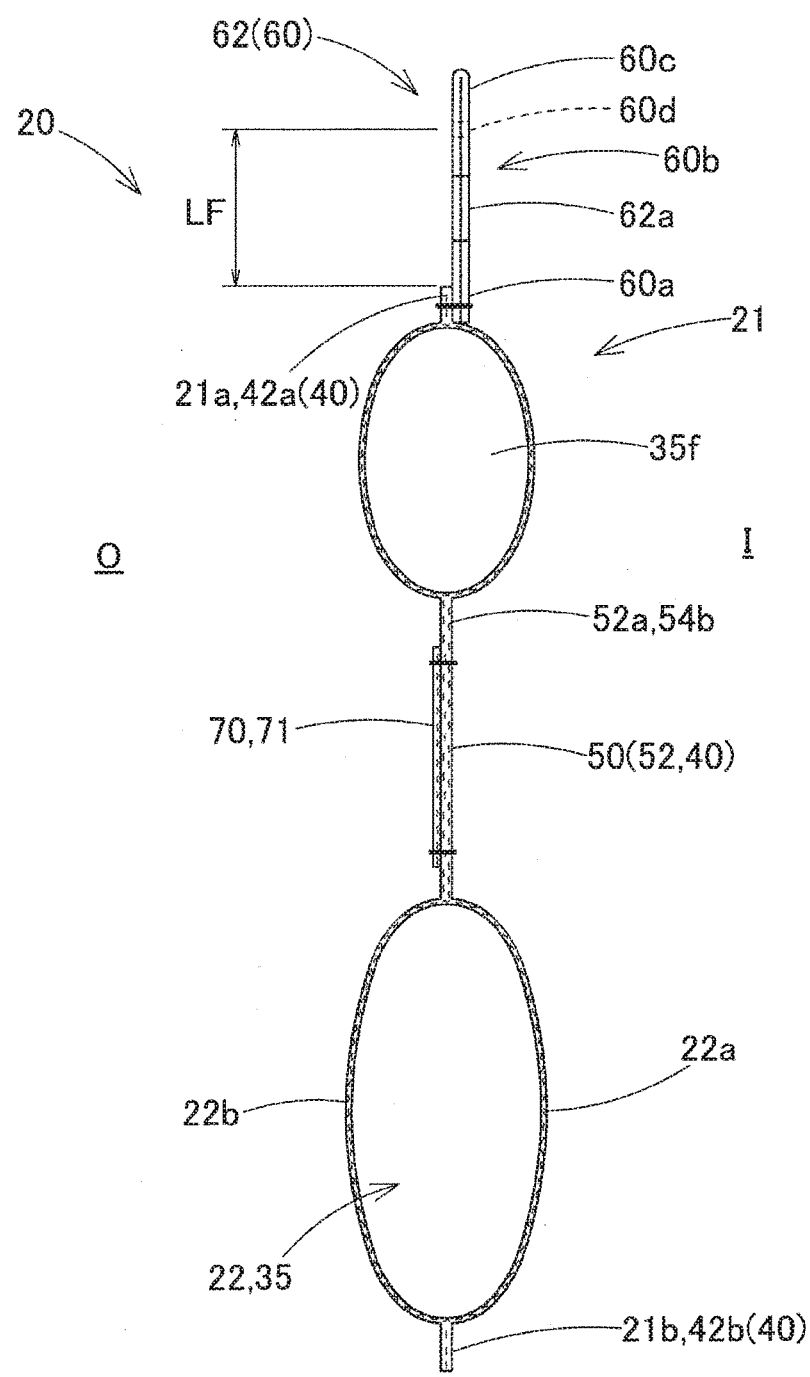
FIG. 4 is a cross-sectional view at the time of inflation of the airbag itself of the embodiment, and a partially enlarged cross-sectional view taken from the line IV-IV of FIG. 2.
Figure 5:
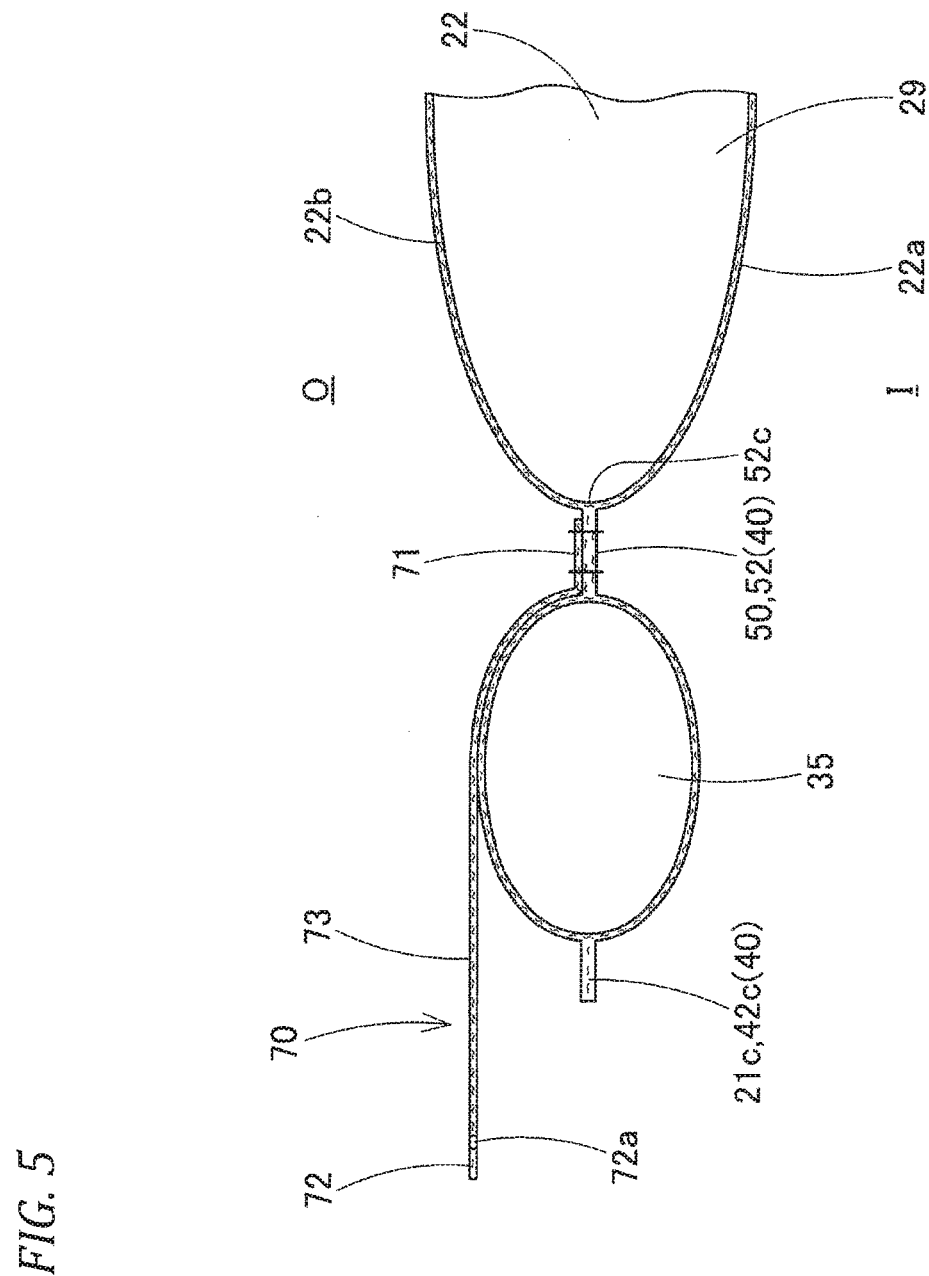
FIG. 5 is a cross-sectional view at the time of inflation of the airbag itself of the embodiment, and a partially enlarged cross-sectional view taken from the line V-V of FIG. 2.

In the case of the embodiments, the bag body 21 is manufactured by a double weaving using polyamide yarns or polyester yarns, etc. As illustrated in FIGS. 2, 4 and 5, the bag body 21 has a gas inflow portion 22 which introduces the inflating gas inside and inflates so as to separate a vehicle inner wall portion 22a located on the vehicle interior side I and a vehicle outer wall portion 22b located on the vehicle exterior side O when completely inflated, and a non-inflow portion 40 which does not introduce the inflating gas by coupling the vehicle inner wall portion 22a and the vehicle outer wall portion 22b.

The gas inflow portion 22 is configured to include a cylindrical connection port portion 24 having an opening 24a for inserting the inflator 14 into the rear end, and a protective inflation portion 25 that thickly inflates the gas flowing via the connection port portion 24. The protective inflation portion 25 is configured to include a supply passage portion 27, main inflation portions 29 and 30, auxiliary inflation portions 32 and 33, and an end-side inflation portion 35.

The supply passage portion 27 communicates with the connection port portion 24 and is disposed along the front-rear direction in the vicinity of the center in the front-rear direction of the upper edge 21a of the bag body 21 so as to make the inflating gas G from the connection port portion 24 flow to both of the front and rear sides.

The main inflation portion 29 is a front main inflation portion 29 through which the front end 27a of the supply passage portion 27 and the upper part 29a communicate with each other, is disposed to cover the window W1 when completely inflated, and is a part for protecting the head of the occupant seated on a front seat (also including a driver seated on a driver's seat as well as an occupant on a passenger's seat). The main inflation portion 30 is a rear main inflation portion 30 through which the rear end 27b of the supply passage portion 27 and the upper part 30a communicate with each other, is disposed no as to cover the window W2 when completely inflated, and is apart for protecting head of the occupant seated on the rear seat.

The auxiliary inflation portion 32 is disposed on the rear side of the front main inflation portion 29 and is a front auxiliary inflation portion 32 which inflates by introducing the inflating gas G from the front main inflation portion 29 through the inflow port 32a. The auxiliary inflation portion 33 is disposed on the front side of the rear main inflation portion 30, and is a rear auxiliary inflation portion 33 which inflates by introducing the inflating gas G from the rear main inflation portion 30 through the inflow port 33a. The auxiliary inflation portions 32 and 33 serve as a pressure adjustment chamber that suppresses a rapid rise of the internal pressure of the main inflation portions 29 and 30, by introducing the inflating gas G from the main inflation portions 29 and 30, when the main inflation portions 29 and 30 hold occupant.

The end-side inflation portion 35 is disposed on the end portion in the front-rear direction of the bag body 21 in adjacent to the front main inflation portion 29, i.e., on the front end 21c, and has a substantially rectangular shape extending in the vertical direction. The end-side inflation portion 35 is disposed on the downstream side of the inflating gas G from the front main inflation portion 29, so as to introduce the inflating gas G from the from main inflation portion 29 and inflate, through the upper and lower distribution ports 36 and 37. The end-side inflation portion 35 is disposed to cover the vehicle interior side from the front side of the window W1 over the front pillar portion FP when completely inflated. In addition, the end-side inflation portion 35 is configured to include an extending portion 35c on the lower edge 35b at the time of completion of inflation, and the extending portion 35c extends downward from the belt line BL of the lower edge WD of the window W1 and can be supported on the door trim DT as the vehicle body side member on the lower edge WD of the window W1.

In an inner part near the connection port portion 24 in the supply passage portion 27 from the connection port portion 24 of the bag body 21, a separate trifurcated inner tube 65 for enhancing the heat resistance is provided (see FIGS. 2 and 6).

The non-inflow portion is configured to include a peripheral edge portion 42 constituting the outer peripheral edge of the gas in flow portion 22, a closing portion 44 that is disposed to regulate the thickness of the protective inflation portion 25 as the inflation portion of the gas inflow portion 22 or define the protective inflation portion 25, and a plurality of mounting piece portions 60 which are disposed to extend upward on the upper edge 21a of the bag body 21 of the airbag 20, and are mounted to the upper edge WU of the windows W1 and W2.

The peripheral edge portion 42 is disposed to surround the periphery of the gas inflow portion 22 over the entire circumference, except for the rear end opening 24a of the connection port portion 24.

The closing portion 44 is configured to include a central closing portion 45, a central front lower closing portion 47, a central rear lower closing portion 48, and a boundary closing portion 50. The central closing portion 45 is intended to partition the supply passage portion 27 and the auxiliary inflation portions 32 and 33, and is disposed in a T-shape having a horizontal bar portion 45a and a vertical bar portion 45b. The vertical bar portion 45b extends upward from the vicinity of the center in the front-rear direction of the lower edge 42b of the peripheral edge portion 42, and partitions the front auxiliary inflation portion 32 and the rear auxiliary inflation portion 33. The horizontal bar portion 45a extends to both of the front-rear sides at the upper end of the vertical bar portion 45b, and partitions the supply passage portion 27 and the front and rear auxiliary inflation portions 32 and 33 at the lower edge of the supply passage portion 27.

The central front lower closing portion 47 is intended to partition the front auxiliary inflation portion 32 and the front main inflation portion 29, and is disposed to extend upward linearly from the part of the lower edge 42b of the peripheral edge portion 42 just below the inflow port 32a so as to form the inflow port 32a between the front end of the horizontal bar portion 45a of the central closing portion 45. The central rear lower closing portion 48 is intended to partition the rear auxiliary inflation portion 33 and the rear main inflation portion 30, and is disposed to extend upward linearly from the part of the lower edge 42b of the peripheral edge portion 42 just below the inflow port 33a so as to form the inflow port 33a between the rear end of the horizontal bar portion 45a of the central closing portion 45.

The boundary closing portion 50 is disposed between the front main inflation portion 29 and the end-side inflation portion 35, and partitions the front main inflation portion 29 and the end-side inflation portion 35. Both of the upper and lower ends 50a and 50b of the boundary closing portion 50 are disposed away from the upper edge 42a and the lower edge 42b of the peripheral edge portion 42, and the boundary closing portion is disposed by providing distribution ports 36 and 37 capable of causing the inflating, gas G from the front main inflation portion 29 to flow to the end-side inflation portion 35, between each of the upper edge 42a and the lower edge 42b.

Furthermore, the boundary closing portion 50 is configured to include a vertical closing portion 52 of the lower side which is disposed linearly along a substantially vertical direction, and an inclined closing portion 54 which is disposed to extend linearly to the oblique upper rear part of the front main inflation portion 29 from the upper end 52a of the vertical closing portion 52. In the case of this embodiment, the boundary closing portion 50 is coupled so that the upper end 52a of the vertical closing portion 52 and the lower end 54b of the inclined closing portion 54 match with each other, and the vertical closing portion 52 and the inclined closing portion 54 are disposed so as to be integrally continued.

Further, the boundary closing portion 50 is configured as a shape in which, as the edge of the front main inflation portion 29, the edge (rear edge) 52c of the vertical closing portion 52 extends along the vertical direction, and the edge (bottom edge) 54c of the inclined closing portion 54 extends along the front-rear direction.

Furthermore, the rear edge 52c of the vertical closing portion 52 is disposed at a position just above the rear edge 35d of the extending portion 35c of the end-side inflation portion 35 to match the positions in the front-rear direction.

The mounting piece portion 60 is apart which mounts the upper edge 21a of the bag body 21 to the inner panel 2 of the body 1 of the vehicle V, in particular, to the inner panel 2 of the roof side rail portion RR in the embodiment, and is disposed at a plurality of locations along the front-rear direction, so as to protrude upward from the upper edge 21a of the bag body 21. In the case of this embodiment, as a separate body from the bag body 21, similarly to the bag body 21, the mounting piece portion 60 is formed of a woven fabric made of polyamide yarns or polyester yarns or the like, a wide base portion 60a of the lower end is disposed on the upper edge 21a of the bag body 21 by sewing using a sewing thread. At the upper end of the mounting piece portion 60, a mounting portion 60c is disposed which has a mounting hole 60d through which the mounting bolt 12 can be inserted, and the mounting portion 60c is mounted with the mounting bracket 11. Each mounting piece portion 60 has a double overlap structure in which woven fabric made of polyamide yarns or polyester yarns or the like is folded by providing a fold on the upper end (see FIG. 4).

As illustrated in FIG. 2, the mounting piece portion 60 is configured to include a single end-side mounting piece portion 62 disposed on the upper edge of the front end serving as the end-side inflation portion 35, and another general mounting piece portion 61 serving as the rear side of the end-side mounting piece portion 62. Four general mounting piece portions 61 are disposed along the front-rear direction in the embodiment.

The general mounting piece portions 61 are sites for fixing the upper edge of the bag body 21 to the upper edge WU of the windows W1 and W2. A length dimension LN (see FIG. 3 and Section B of FIG. 8) from the upper edge 21a of the bag body 21 in the general mounting piece portion 61 to the mounting hole 60d of the mounting portion 60c is set to a dimension that covers the whole by the roof head lining 5 upon completed inflation of the airbag 20, without exposing the general mounting piece portion 61 downward from the roof head lining 5.

The end-side mounting piece portion 62 is disposed to extend upward from the upper edge 21a of the bag body 21 near the boundary closing portion 50 which is shifted to the rear side of the front main inflation portion 29 from just upper area of the vertical closing portion 52 at the boundary closing portion 50 in the case of the embodiment, and is configured to fix the mounting portion 60c of the upper end to the inner panel 2 of the roof side rail portion RR near the front pillar portion FP. Further, the end-side mounting piece portion 62 sets a length dimension LF (see FIGS. 3 and 4) from the upper edge 21a of the bag body 21 to the mounting hole 60d of the mounting portion 60c in a flat deployed state to be greater than the length dimension LN from the upper edge 21a of the bag body 21 in the general mounting piece portion 61 to the mounting hole 60d. In the case of this embodiment, as illustrated in FIGS. 11 and 12, when completely inflating the airbag 20, the end-side inflation portion 35 has a configuration that disposes the upper edge 35a to cover the vehicle interior side I of the upper part 4b of the front pillar garnish 4, and the end-side mounting piece portion 62 is deviously disposed to escape the part of the lower edge 5a of the roof head lining 5 (airbag cover 9) upon completion of inflation of the airbag 20, as illustrated in FIG. 13. Therefore, the end-side mounting piece portion 62 is set the length dimension LF from the bag body 21 to a dimension that can dispose the upper edge 35a of the end-side inflation portion 35 at a position supported on the upper part 4b of the front pillar garnish 4 or the part 5b of the roof head lining 5 in the vicinity thereof, without excessively pulling the end-side inflation portion 35. In the case of this embodiment, the length dimension LF of the end-side mounting piece portion 62 is set to be substantially four times the length dimension LN of the general mounting piece portion 61.

Figure 14:
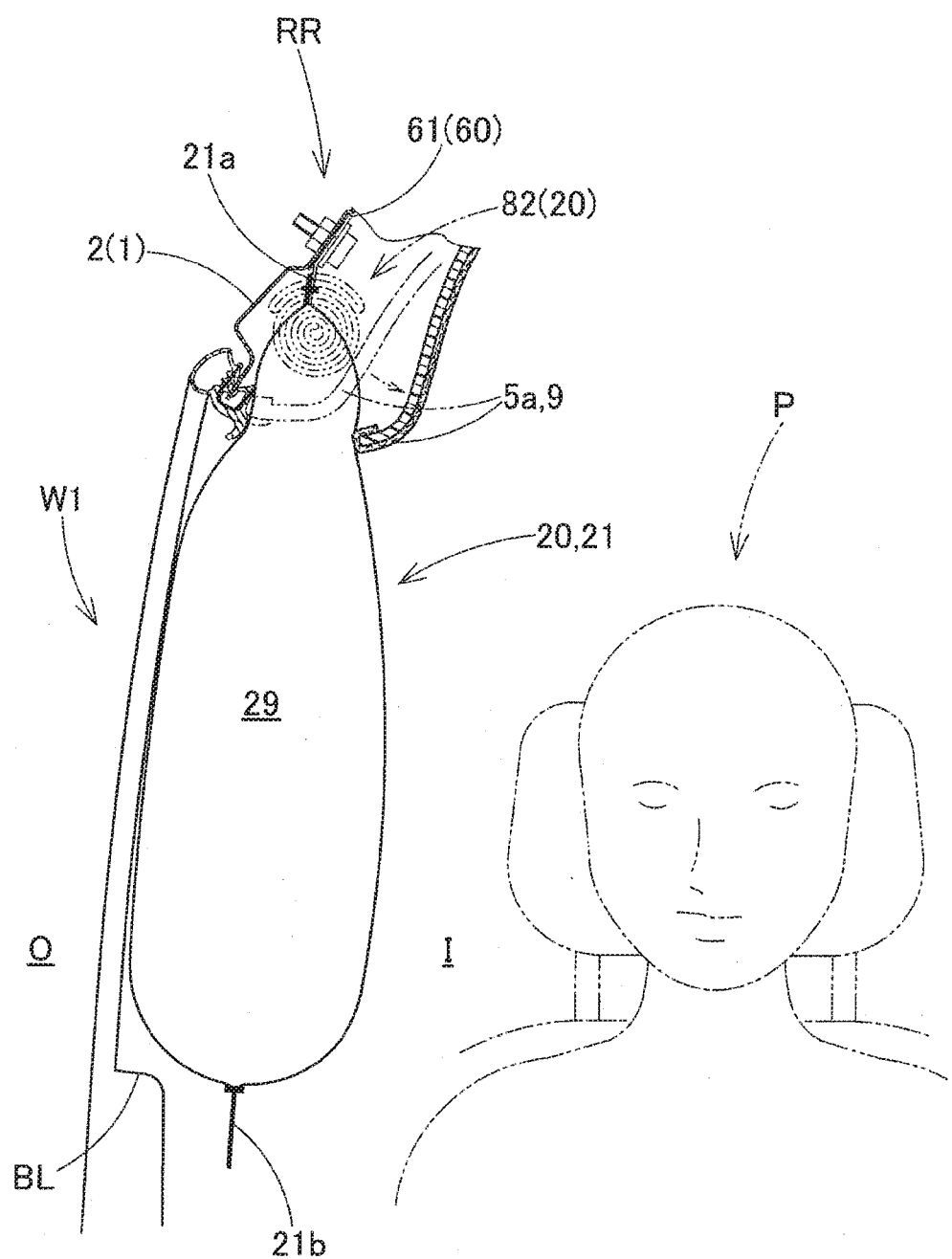
FIG. 14 is a schematic vertical cross-sectional view along the vertical direction illustrating a state in which the airbag is completely inflated in the head protection airbag device of the embodiment, corresponding to the part XIV-XIV in Section B of FIG. 10.

In the part of another general mounting piece portion 61, at the time of completed inflation of the airbag 20, as illustrated in FIG. 14, the general mounting piece portion 61 has a configuration that does not protrude downward from the roof head lining 5.

In the intermediate portion 60b between the base portion 60a and the mounting portion 60c at the end-side mounting piece portion 62, substantially semicircular ear portions 62a and 62a protruding in the front-rear direction are formed at both side edges in the front-rear direction. The ear portions 62a and 62a are used to make a mounting length dimension LA (see Section B of FIG. 8) from the upper edge 21a of the bag body 21 of the end-side mounting piece portion 62 to the mounting hole 60d of the mounting portion 60c similar to the length dimension LN of the general mounting piece portion 61, when a folded body 81 formed by folding the airbag 20 is mounted to the vehicle V. That is, after folding the airbag 20 so as to bring the lower edge closer to the upper edge 21a, when forming the airbag 20 into a rod-like folded body 80 along the front-rear direction (see Section A of FIG. 8), as long as the length dimension LF of the end-side mounting piece portion 62 is kept long, when mounting the end-side mounting piece portion 62 at the arrangement position of the roof side rail portion RR of the same height as the other general mounting piece portion 61, the part of the end-side mounting piece portion 62 in the folded body 80 is undesirably lowered to come too closer to the lower edge 5a of the roof head lining 5 or is undesirably exposed from the lower edge 5a. Therefore, before mounting the airbag 20 to the vehicle V, the end-side mounting piece portion 62 is folded zigzag with a plurality of folds 62b along the front-rear direction of the airbag 20 (see parentheses in Section B of FIG. 8), the mounting hole 60d is brought closer to the upper edge 21a of the bag body 21, and the length dimension LA from the upper edge 21a to the mounting hole 60d is made to coincide with the length dimension LN from the upper edge 21a of the general mounting piece portion 61 to the mounting hole 61a. Further, in order to maintain the arrangement state, the ear portions 62a and 62a are made to abut on the outer circumferential surface 80a of the folded body 80, an folding collapse prevention material (tape material) 75 having adhesion properties is wound around the outer circumferential surface 80a of the folded body 80 together with the ear portions 62a and 62a, and the ear portions 62a and 62a are fixed to the outer circumferential surface 80a of the folded body 80 so as to be interposed between the folding collapse prevention material 75 and the folded body 80.

Figure 3:
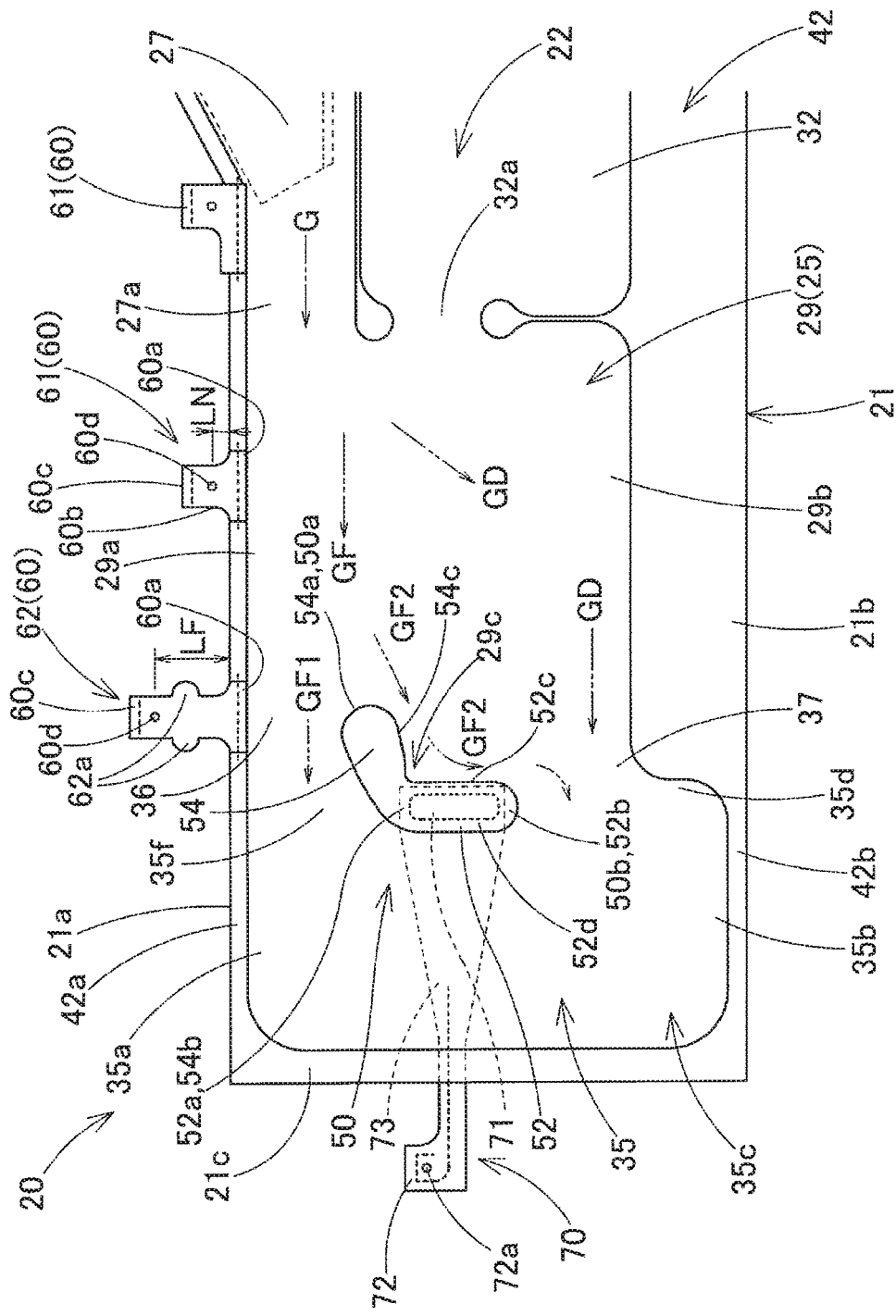
FIG. 3 is a partially enlarged front view illustrating the vicinity of an end-side inflation portion of the airbag of the embodiment.

The tension cloth 70 is made up of a seat material having flexibility, and is formed of a woven fabric made of polyamide yarns or polyester yarns or the like in the embodiment. The tension cloth 70 is disposed on the vehicle exterior side O of the end-side inflation portion 35 at the time of the completion of inflation of the bag body 21 as illustrated in FIGS. 3 to 5, and couples the rear end portion 71 serving as the base portion to the vertical closing portion 52 of the boundary closing portion 50 by sewing. In the case of the embodiment, the tension cloth 70 has an outer shape of a substantially triangular plate shape in which the rear end portion 71 is a bottom edge as illustrated in FIGS. 3 and 6, and the mounting hole 72a is disposed at the tip end portion (mounting portion) 72 serving as the front end. The tension cloth 70 is configured to cover the vehicle exterior side O of the region of the intermediate part in the vertical direction of the end-side inflation portion 35, by an intermediate portion 73 between the rear end portion 71 and the front end portion 72. Further, the front end portion 72 of the tension cloth 70 constitutes a mounting portion, which is fixed to the position of the inner panel 2 of the body 1 at the part of the front pillar portion FP on the front side of the end-side inflation portion 35, and similarly to the mounting piece portion 60, the front end portion 72 has a configuration fixed to the inner panel 2 using the mounting bracket 11 and the mounting bolt 12 (see FIG. 12), and includes a mounting hole 72a through which the mounting bolt 12 can be inserted.

In the airbag 20 of the embodiment, at the time of completion of inflation when mounted on the vehicle, the protective inflation portion 25 is inflated so as to reduce the width dimension in the front-rear direction from anoninflated state, and as illustrated in FIG. 11, tension T along substantially the front-rear direction is generated between the front end portion 72 which is disposed at the tip end of the tension cloth 70 and the general mounting piece portion 61B disposed on the rear end of the bag body 21.

Figure 7:
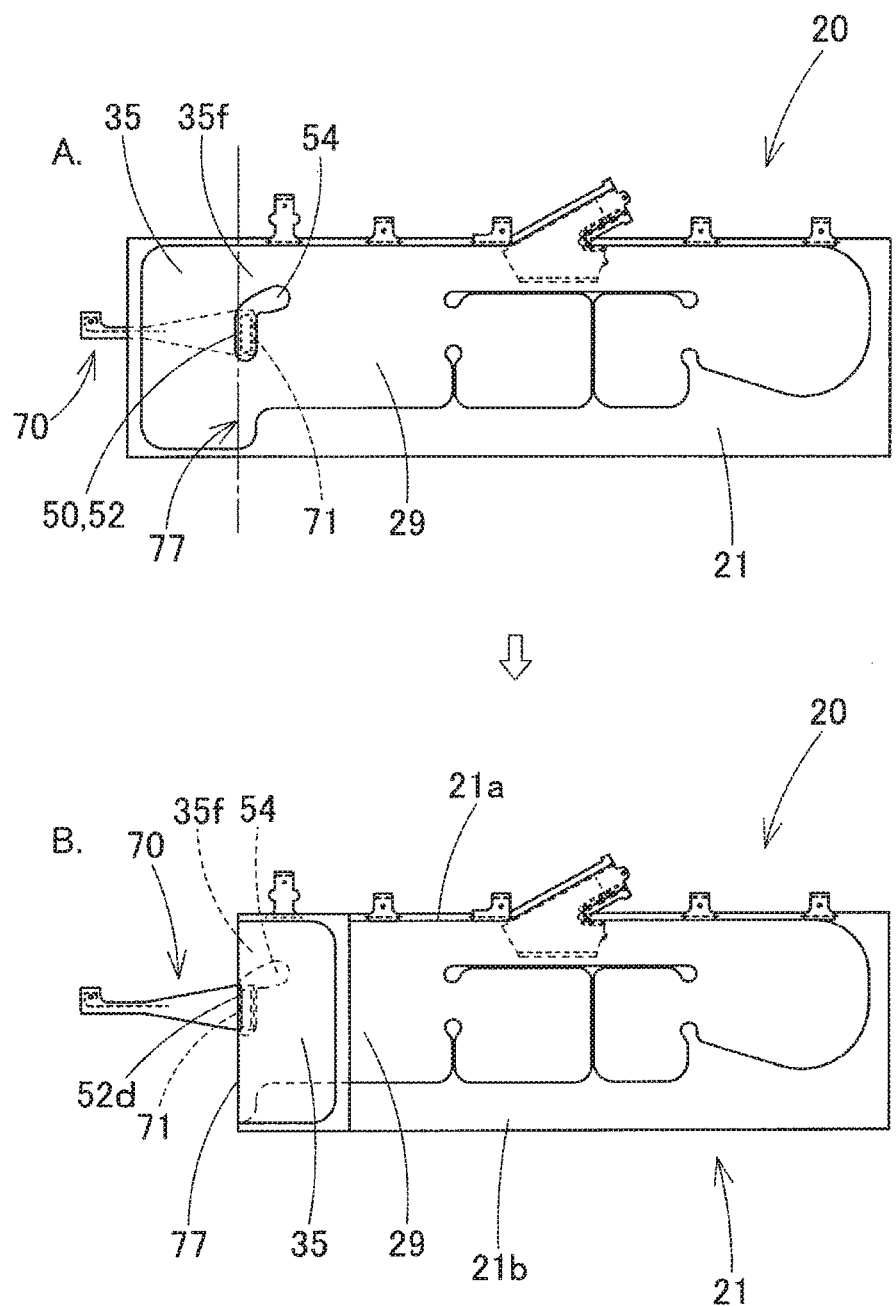
FIG. 7 is a diagram illustrating a folding process of the airbag of the embodiment.

Next, mounting of the head protection airbag device HM on the vehicle V of the embodiment will be described. The tension cloth 70 is sewn in advance, as illustrated in FIG. 7, in the bag body 21 of the state in which the vehicle inner wall portion 22a and the vehicle outer wall portion 22b are superimposed and deployed flatly, a fold 77 is provided on the front edge 52d of the vertical closing portion 52 of the boundary closing portion 50 (more specifically, the part of the vertical closing portion 52 on the slightly forward side of the coupling part of the rear end portion 71 of the tension cloth 70, see FIG. 3), and the end-side inflation portion 35 is folded to the side of the vehicle inner wall portion 22a of the front main inflation portion 29. Then, as illustrated in Section B of FIG. 7 and in Section A of FIG. 8, the folded body 80 of the airbag 20 is formed by folding the tension cloth 70 so that the lower edge 21b approaches to the upper edge 21a. Then, as illustrated in Section B of FIG. 8, by the breakable folding collapse prevention material 75, the folded body 80 is wrapped at a predetermined position, and as already described, by folding the end-side mounting piece portion 62 in a zigzag manner, so as to stop the ear portions 62a and 62a on the outer circumferential surface 80a, the folding collapse prevention material 75 is also wrapped at the part of the ear portions 62a and 62a to form the folded body 81.

Figure 8:
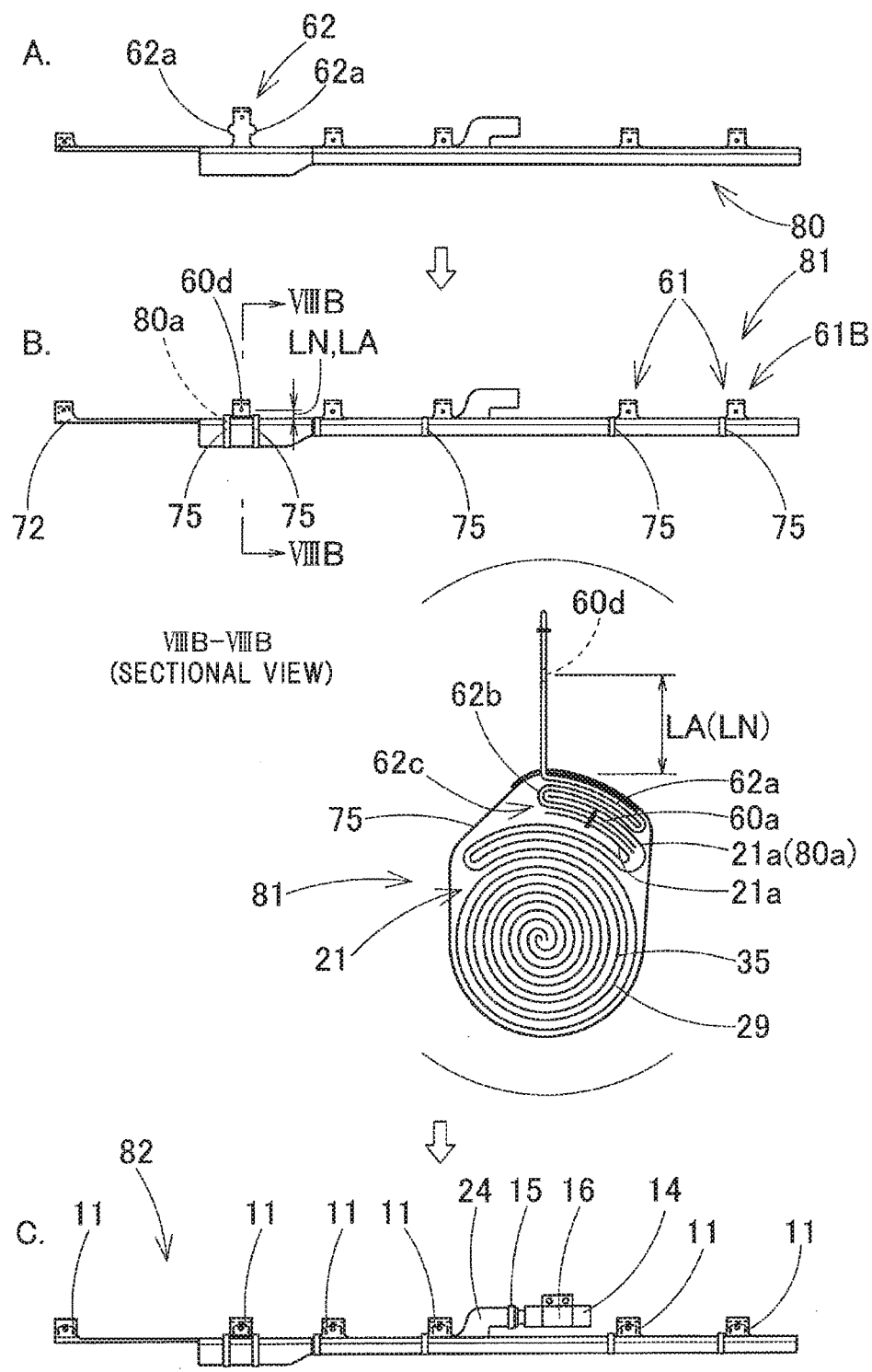
FIG. 8 is a diagram illustrating the folding process of the airbag of the embodiment and a process of forming an airbag assembly body, which are the subsequent process of FIG. 7.

Thereafter, as illustrated in Section C of FIG. 8, the mounting bracket 16 to which the inflator 14 is mounted is connected to the connection port portion 24 of the airbag 20, by utilizing the clamp 15, and the mounting bracket 11 is fixed to the mounting portion 72 of the tension cloth 70, the end-side mounting piece portion 62 and the respective general mounting piece portions 61 to form an airbag assembly body 82.

Next, mounting brackets 11 and 16 are disposed at a predetermined position of the inner panel 2 of the body 1, the bolts 12 and 17 are fastened, a lead line (not illustrated) extending from a control unit for a predetermined inflator operation is wired to the inflator 14, the front pillar garnish 4 and the roof head lining 5 are mounted to the inner panel 2 of the body 1, and furthermore, if the pillar garnishes 6 and 7 are mounted to the inner panel 2 of the body 1, the head protection airbag device HM can be mounted to the vehicle V.

After mounting of the head protection airbag device HM onto the vehicle V, at the time of side collision of the vehicle V, at the time of oblique collision or at the time of roll-over, if the inflator 14 is actuated by receiving the operation signal from the control unit, the inflating gas discharged from the inflator 14 flows into the bag body 21, the inflated bag body 21 breaks the folding collapse prevention material 75, pushes and opens the airbag cover 9 constituted by the edges 4a and 5a constituted of the front pillar garnish 4 and the roof head lining 5, and is greatly inflated so as to cover the windows W1 and W2, the front pillar portion FP, the center pillar portion CP, and the vehicle interior side I of the rear pillar portion RP, while projecting downward, as illustrated in two-point chain line in FIG. 1 and FIG. 11.

At this time, for example, if the oblique collision occurs, the peripheral airbag device (airbag device for driver's seat) CM mounted on the front side of the steering wheel W of the driver's seat is also actuated, and the peripheral airbag CA also enters a state of completing the inflation (see FIG. 11).

When the inflating gas is supplied to the bag body 21 of the airbag 20 of the embodiment, the inflating gas G flows to the upper portions 29a and 30a of the front main inflation portion 29 and the rear main inflation portion 30 from the supply passage portion 27 via the connection port portion 24, eliminates the fold 77 via the upper and lower distribution ports 36 and 37 of the boundary closing portion 50, and flows into the end-side inflation portion 35, the main inflation portions 29 and 30 and the end-side inflation portion 35 are deployed and inflated to complete the inflation, and the auxiliary inflation portions 32 and 33 are also completely inflated (see FIG. 2).

At that time, as illustrated in FIG. 3, on the front end 21c of the airbag 20, the inflating gas G that has flowed into the upper part 29a of the front main inflation portion 29 from the front end 27a of the supply passage portion 27 inflates the front main inflation portion 29, and simultaneously flows into the end-side inflation portion 35 on the upper part 29a of the front main inflation portion 29. Further, in the inflating gas GF that has flowed to the end-side inflation portion 35 at the upper part 29a of the front main inflation portion 29, the inflating gas GF1 that does not hit the inclined closing portion 54 of the upper side of the boundary closing portion 50 flows into the upper part (upper edge 35a) of the end-side inflation portion 35 via the distribution port 36 of the upper side as it is, thereby deploying and inflating the end-side inflation portion 35. Further, in the inflating gas GF that has flowed to the end-side inflation portion 35 on the upper part 29a of the front main inflation portion 29, a inflating gas GF 2 that hits the inclined closing portion 54 of the upper side of the boundary closing portion 50 is guided to the lower edge 54c of the front main inflation portion 29 of the inclined closing portion 54, changes the flow in the downward direction, and flows to the lower edge (lower part 29b) of the front main inflation portion 29 via the rear edge 52c of the front main inflation portion 29 of the vertical closing portion 52. Then, the inflating gas GF 2 that has flowed into the lower part (lower edge) 29b of the front main inflation portion 29 along the vertical closing portion 52 flows into the upper part 29a of the front main inflation portion 29 so as to deploy and inflate the front main inflation portion 29 via the front end 27a of the supply passage portion 27 and is joined with the inflating gas GD directed downward, flows into the lower part (lower edge 35b) of the end-side inflation portion 35 via the distribution port 37, thereby inflating the end-side inflation portion 35.

That is, the inclined closing portion 54 of the upper side of the boundary closing portion 50 divides the inflating gas GF flowing to the end-side inflation portion 35 from the supply passage portion 27 into a gas (inflating gas GF1) which flows into the upper edge 35a of the end-side inflation portion 35 from the upper distribution port 36, and a gas (inflating gas GF 2) which flows into the lower side of the end-side inflation portion of the lower distribution port 37, and when flowing into the end-side inflation portion 35 from the lower distribution port 37, the inflating gas GD which has deployed and inflated the front main inflation portion 29 is also made to merge, and by the inflating gases GF and GD introduced from the upper and lower distribution ports 36 and 37 while being joined, it is possible to bring the completion timing of the deployment and inflation of the end-side inflation portion 35 close to the completion timing of the deployment and inflation of the front main inflation portion 29, as much as possible.

In the head protection airbag device HM of the embodiment, accordingly, it is possible to quickly complete the deployment and inflation of the end-side inflation portion 35 of the airbag 20. Therefore, in the head protection airbag device HM of the embodiment, it is possible to properly protect the occupant P who moves in an obliquely forward direction of the vehicle exterior side O at the time of oblique coil s on of the vehicle V by the end-side inflation portion 35 of the airbag 20 which is quickly inflated, and it is possible to smoothly dispose the deployed and inflated end-side inflation portion 35 on the side of the peripheral airbag CA.

In the embodiment, the shift time of the completion timing of the deployment and inflation of the end-side inflation portion delayed from the completion timing of the deployment and inflation of the front main inflation portion in the airbag of the conventional type can be reduced to about ⅙.

Further, in the head protection airbag device HM of the embodiment, the boundary closing portion 50 of the airbag 20 integrally and continuously disposes the vertical closing portion 52 and the inclined closing portion 54.

Therefore, in the embodiment, since the vertical closing portion 52 and the inclined closing portion 54 of the boundary closing portion 50 are continuously continued, as compared with a case of providing an area having no closing portion between the vertical closing portion 52 and the inclined closing portion 54, it is possible to allow the total amount of inflating gas GF 2 guided to the lower edge 54c of the front main inflation portion 29 of the inclined closing portion 54 to smoothly flow to the lower distribution port 37, which can contribute to quickly complete the inflation of the end-side inflation portion 35.

Further, if it is possible to allow the inflating gas GF 2 to smoothly flow to the lower distribution port 37, a small area with no closing portion may be provided between the vertical closing portion 52 and the inclined closing portion 54.

In the embodiment, the boundary closing portion 50 of the airbag 20 is configured in a shape in which, as the edge of the front main inflation portion 29, the trailing edge 52c of the vertical closing portion 52 extends along the vertical direction, and the lower edge 54c of the inclined closing portion 54 extends along the front-rear direction.

In the embodiment, therefore, a front upper corner 29c of the front main inflation portion 29 of the side partitioned by the boundary closing portion 50 is configured to form a corner of about 90°, width dimensions of both directions of the front-rear direction and the vertical direction of the front main inflation portion 29 is widened to widen the capacity of the front main inflation portion 29, and it is possible to thickly bulge the thickness of the front main inflation portion at the time of inflation, which can contribute to improving the occupant protection performance.

In the head protection airbag device HM of the embodiment, as a folding shape of the end-side inflation portion 35 of the airbag 20 to the upper edge WU of the window W1, as illustrated in FIG. 7, a fold 77 is provided in the vertical closing portion 52 of the boundary closing portion 50, and a folding shape of the folded body 80 is obtained which is folded in a state of including the state of folding the end-side inflation portion 35 on the side of the vehicle inner wall portion 22a of the front main inflation portion 29, and, as illustrated in Section B of FIG. 7 and Section A of FIG. 8, in the state of bringing the lower edge 21b of the airbag 20 closer to the upper edge 21a. Further, the end-side mounting piece portion 62 provided at the end portion (front end) 21c of the end-side inflation portion 35 on the upper edge 21a of the airbag 20 is located in the vicinity of the boundary closing portion 50 in the rear direction of the front main inflation portion 29 from the just upper area so as to be able to form the fold 77 of the vertical closing portion 50 in the folded shape, is disposed to be mountable to the roof side rail portion RR of the vehicle V, and is disposed as a length dimension LF in which the vertical length dimension LN is formed to be longer from the other general mounting piece portion 61. Furthermore, the end-side inflation portion 35 of the airbag 20 at the time of completion of inflation is disposed to be able to cover the vehicle interior side I of the front pillar portion FP extending from the roof side rail portion RR and connected to the lower edge WD of the window W1.

In the embodiment, since the end-side inflation portion 35 as an inflated part on the end of airbag 20 is stored by being folded on the roof side rail portion RR of the vehicle V, rather than the front pillar portion FP of the vehicle V, even when there is no space in the front pillar portion FP, the airbag 20 can be easily folded and stored on the upper edge WU of the window W1. Further, even in a configuration in which the length dimension LF in the vertical direction of the end-side mounting piece portion 62 is longer than the length dimension IN of the other general mounting piece portion 61, and the end-side inflation portion 35 completes the deployment and inflation to cover the vehicle interior side I of the front pillar portion FP, as illustrated in FIGS. 11 and 13, through the lower edge 5a of the airbag cover 9 such as the roof head lining 5 of the roof side rail portion RR, the upper part (upper edge) 35a of the end-side inflation portion 35 can be disposed on the roof side rail portion RR and the vehicle interior side I of the from pillar portion FP, which makes it possible to widely secure a protection area of the occupant P of the end-side inflation portion 35.

Figure 9:
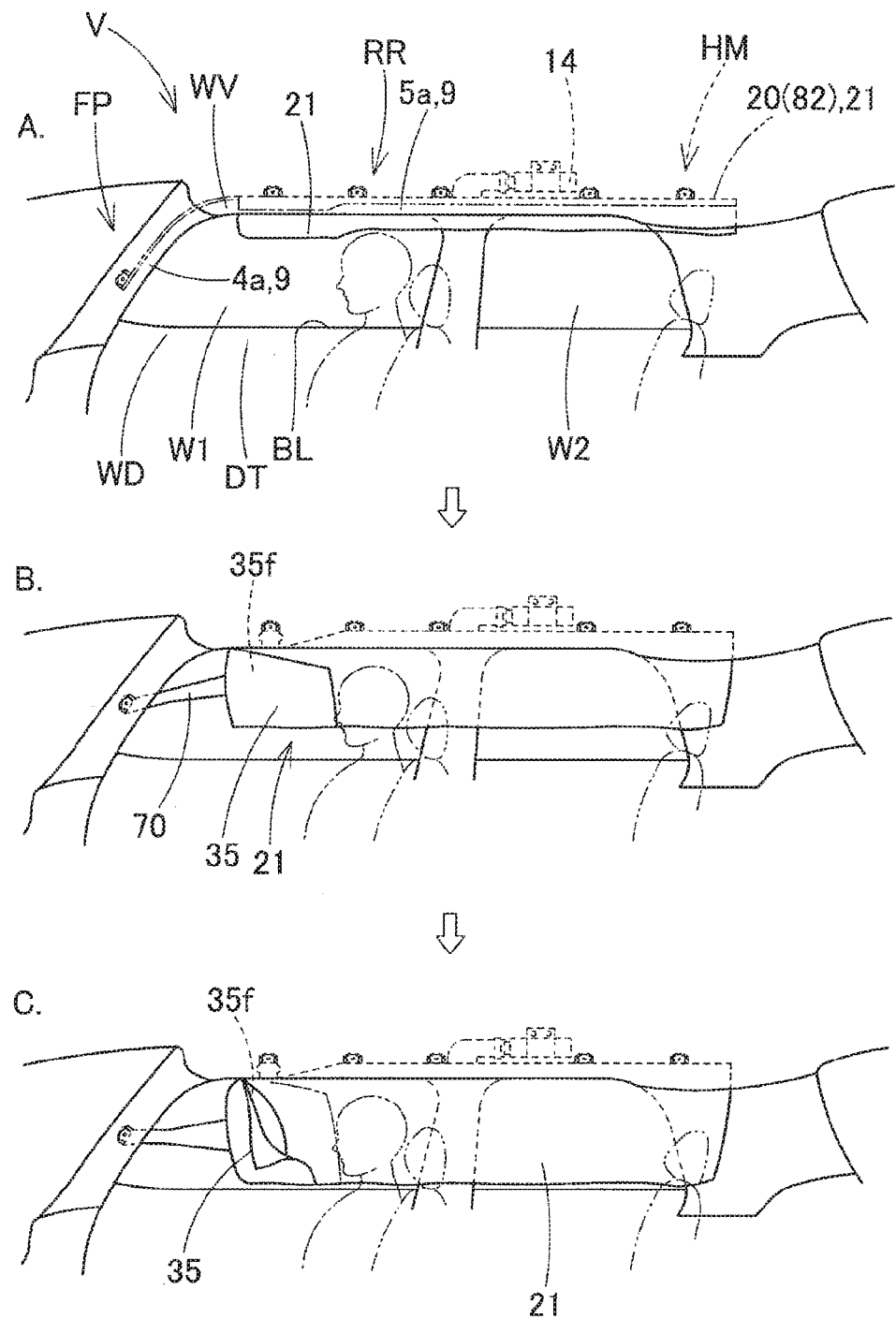
FIG. 9 is a diagram illustrating an operation of the head protection airbag device in a time sequence of the embodiment.
Figure 10:
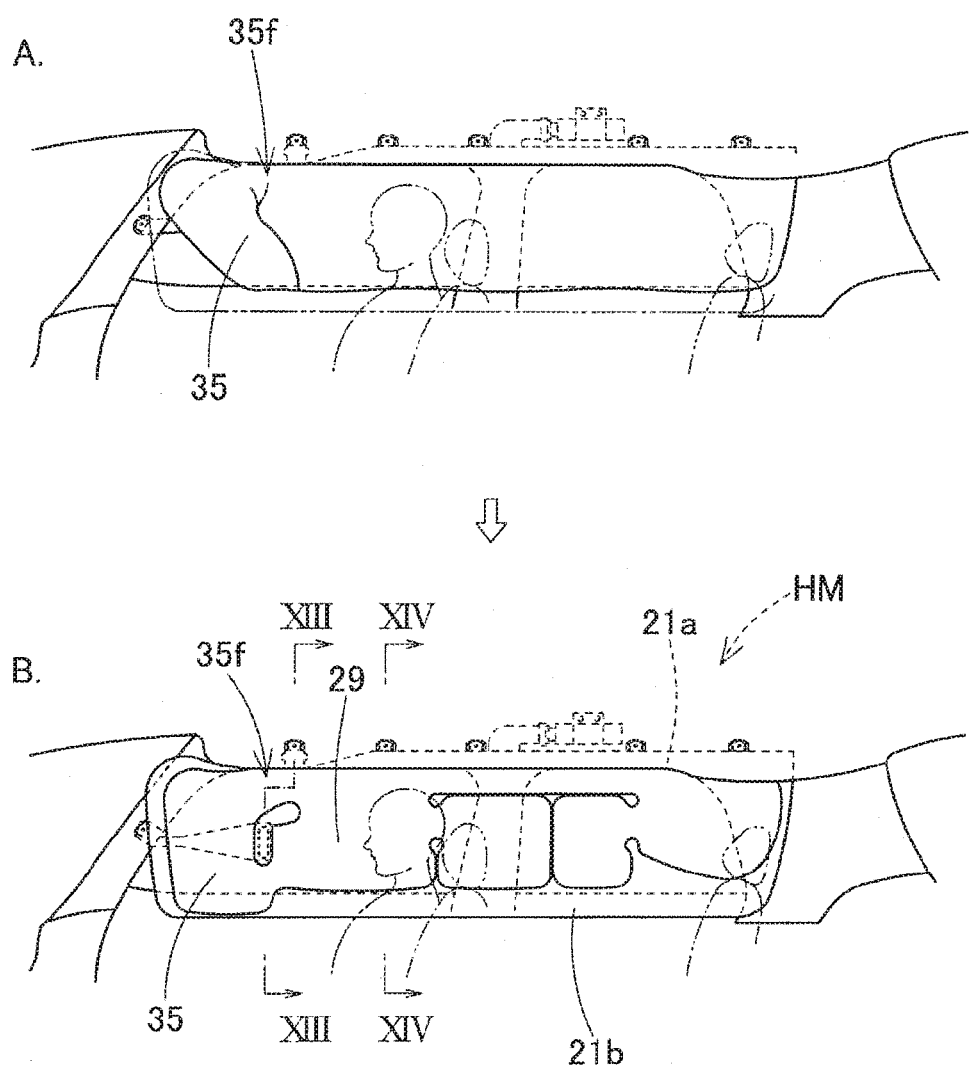
FIG. 10 is a diagram illustrating an operation of the head protection airbag device in a time sequence of the embodiment, which is a subsequent state of FIG. 9.

In the configuration of the embodiment, as illustrated in FIGS. 9 and 10, even if the end-side inflation portion 35 is folded back to the front main inflation portion 29, at the first time when the inflating gas G flows into the end-side inflation portion 35, as long as there is a folding shape which brings the lower edge 21b of the airbag 20 closer to the upper edge 21a, the inflating gas GF1 inflows from the upper distribution port 36 (see FIG. 3), at that time, in the boundary closing portion 50, the inclined closing portion 54 of the upper side of the vertical closing portion 52 is disposed on the front main inflation portion 29 by the fold 77 that folds the end-side inflation portion 35 to the front main inflation portion 29, as illustrated in FIG. 7, and further, is disposed so as to extend in a diagonal rearward and upward direction of the front main inflation portion 29. That is, on the upper part of the inclined closing portion 54 of the front main inflation portion 29 from the fold 77 in which the end-side inflation portion 35 is folded to the front main inflation portion 29, a deployed inflation portion 35f deployed from the distribution port 36 to the end-side inflation portion 35 is disposed. Therefore, at the first time when the inflating gas GF1 flows into the end-side inflation portion 35, the inflating gas GF1 flows into the deployed inflation portion 35f from the upper distribution port 36, the deployed inflation portion 35f disposed on the vehicle exterior side O deploys the end-side inflation portion 35 folded to the side of the vehicle inner wall portion 22a of the front main inflation portion 29, and is in a state of being pushed in the direction of the vehicle interior side I (see FIGS. 9 and 10). As a result, the folded and superimposed end-side inflation portion 35 of the front main inflation portion 29 can rapidly eliminate the folding, and can be deployed so as to be continued in a plane shape from the front main inflation portion 29 in the front-rear direction, which makes it possible to ensure the subsequent rapid deployment and inflation.

In the embodiment, the description has been given of a case where even if the fold 77 is added to the vertical closing portion 52 of the boundary closing portion 50 and the end-side inflation portion 35 is disposed on the side of the vehicle inner wall portion 22a of the front main inflation portion 29, and further more, the lower edge 21b of the bag body 21 is folded on as to be brought closer to the upper edge 21a, the end-side mounting piece portion 62 is disposed on the rear part from the just upper area of the vertical closing portion 52 near the boundary closing portion 50 so as to be able to fix the end-side mounting piece portion 62 to the roof side rail portion RR. However, the end-side inflation portion 35 can be folded by adding the fold 77 in the vertical closing portion 52, and as long as it is possible to fix the end-side mounting piece portion 62 to the roof side rail portion RR in the folded state of the folded body 80, the end-side mounting piece portion 62 may be disposed on the just upper area of the vertical closing portion 52.

In addition, as long as the deployed inflation portion 35f can smoothly push and open the end-side inflation portion 35, the fold 77 may fold the end-side inflation portion 35 to the side of the vehicle inner wall portion 22a of the front main inflation portion 29, as the fold 77 along the vehicle direction, in the area of the end-side inflation portion 35 near the vertical closing portion 52, rather than the area of vertical closing portion 52 itself.

In the head protection airbag device HM of the embodiment, the airbag 20 is configured to dispose a tension cloth 70 that connects the vehicle outer wall portion 22b of the boundary closing portion 50 at the time of completion of inflation and the inner panel 2 of the part of the front pillar portion FP, can exert a tension 7 along the front-rear direction to the lower edge 21b of the airbag 20 at the time of completion of inflation, and can the support the vehicle exterior side O of the end-side inflation portion 35.

In the embodiment, accordingly, if the airbag 20 is completely inflated, by the tension cloth 70, the tension along the front-rear direction is generated on the lower edge 21b of the airbag 20 (see FIG. 11), the main inflation portions 29 and 30 and the end-side inflation portion 35 is restricted from moving in the direction of the v hide exterior side O, and it is possible to accurately hold the occupant P. In addition, since the tension cloth 70 supports the vehicle exterior side O of end-side inflation portion 35, as illustrated in FIG. 12, it is possible to allow the end-side inflation portion 35 to protrude to the vehicle interior side I from the front main inflation portion 29, it is possible to stably store and hold the occupant P who moves to the end-side inflation portion 35 along the front-rear direction, by the end-side inflation portion 35 protruding to the vehicle interior side I, and it is possible to improve the protection performance of the occupant P in the airbag 20.

In the head protection airbag device HM of the embodiment, the end-side inflation portion 35 at the time of completion of inflation of the airbag 20 is configured to include the extending portion 35c which extends downward from the belt line RI, of the lower edge WD of the window W1 of the vehicle V and can be supported on the door trim DT of the low edge WD of the window W1 (see FIG. 11).

In the embodiment, accordingly, at the time of completion of inflation of the airbag 20, the extending portion 35c of the end-side inflation portion 35 is supported on the door trim DT of the lower edge WD of the window W1 in the vehicle interior side I, thereby preventing the lower edge 21b of the airbag 20 from moving to the vehicle exterior side O beyond the window W1. Accordingly, the occupant P can be restrained on the vehicle interior side I by the airbag 20, and even at the time of the roll-over of the vehicle V, the occupant P can be suitably protected.

In the embodiment, although an example of the airbag 20 having the configuration in which the end-side inflation portion 35 is disposed on the front end 21c of the bag body 21 has been described, the arrangement position of the end-side inflation portion 35 is not limited to the embodiment, and the end-side inflation portion 35 may be configured to be disposed on the rear end of the bag body 21.

Figure 15:
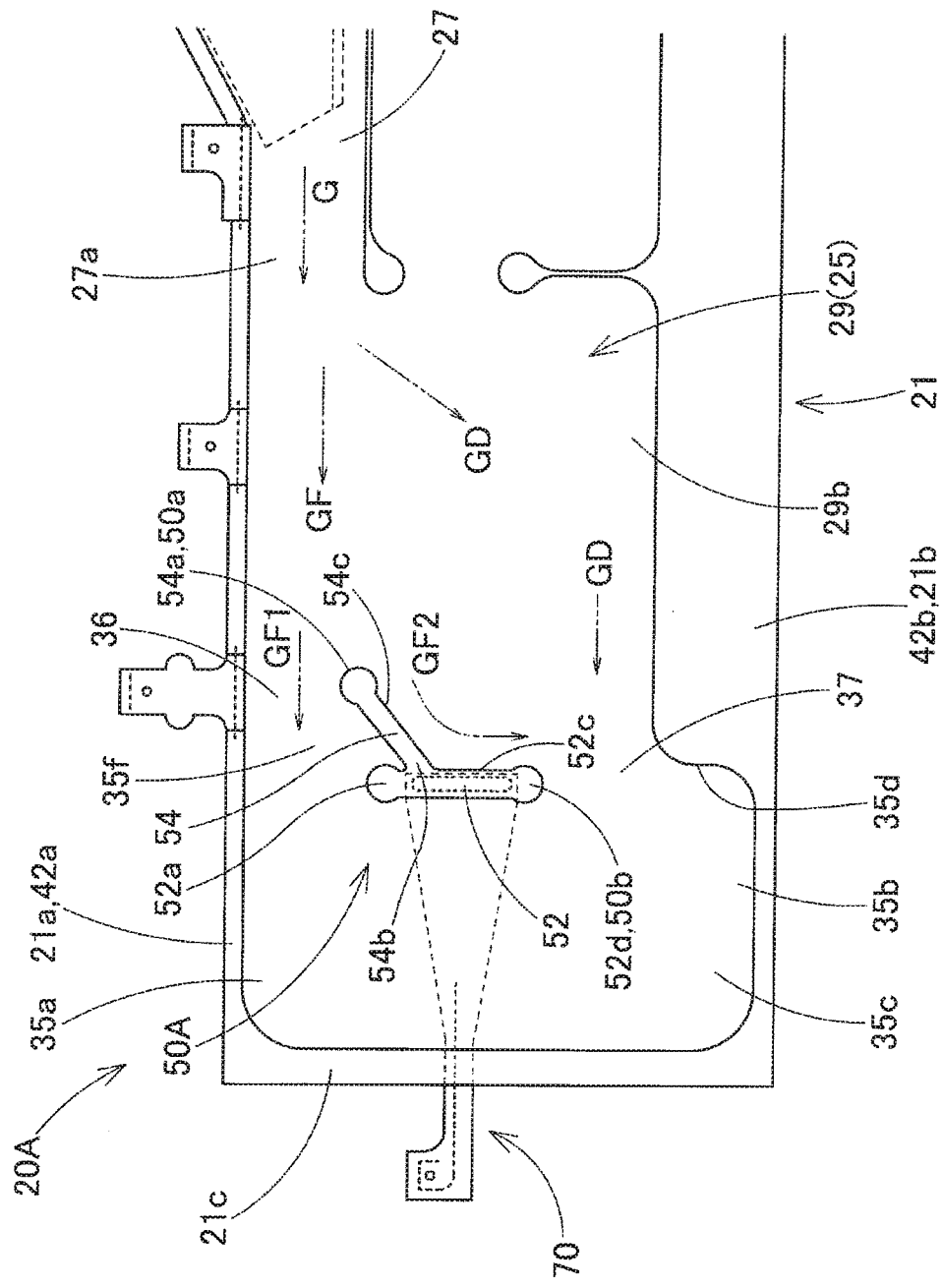
FIG. 15 is a partially enlarged front view illustrating the vicinity of the end-side inflation portion in the airbag of a modified example of the embodiment.

In the airbag 20 of the embodiment, although a configuration has been described in which the inclined closing portion 54 of the boundary closing portion 50 extends in a diagonally upward direction of the front main inflation portion 29 from the upper end 52a itself of the vertical closing portion 52 so as to coincide with the lower end 54b of the inclined closing portion 54, the inclined closing portion 54 may extend in the diagonally upward direction of the front main inflation portion 29 from the upper end 52a of the vertical closing portion 52, and may be configured as in the airbag 20A of FIG. 15. In the airbag 20A, in the boundary closing portion 50A partitioning the end-side inflation portion 35 and the front main inflation portion 29, the lower end 54b of the inclined closing portion 54 is disposed in the vicinity of the just below the upper end 52a of the vertical closing portion 52, and the upper end 54a extends obliquely upward from the lower end 54b, and the inclined closing portion 54 may be configured in this manner.

In the case of the embodiment, although the mounting piece portion 60 is formed as a separate body from the bag body 21, the mounting piece portion 60 may be integrally formed with the bag body 21.

In the head protection airbag device of the embodiment, although the description has been given of a case where the end-side mounting piece portion 62 is fixed to the inner panel 2 of the roof side rail portion RR, as long as there is a configuration which folds back the end-side inflation portion 35 to the main inflation portion 29, a configuration in which the end-side mounting piece portion 62 is fixed to a boundary part between the front pillar portion FP and the roof side rail portion RR, or to the body near the roof side rail portion RR of the front pillar portion FP.

What is claimed is:

1. A head protection airbag device equipped with an airbag, the airbag being stored in a folded state on an upper edge of a window on a vehicle interior side of a vehicle side surface, and being deployed and inflated downward at the time of inflow of an inflating gas to cover the vehicle interior side of the window, wherein:
   the airbag is equipped with a gas inflow portion configured to be swelled to separate a vehicle inner wall portion and a vehicle outer wall portion by introducing the inflating gas, and a non-inflow portion which does not introduce the inflating gas by coupling the vehicle inner wall portion and the vehicle outer wall portion;
   the gas inflow portion is equipped with, as an inflation part for introducing the inflating gas and inflating, a main inflation portion that covers the vehicle interior side of the window, an end-side inflation portion which is disposed at an end portion in a front-rear direction of the airbag in adjacent to the main inflation portion and is disposed on a downstream side of the inflating gas from the main inflation portion, and a supply passage portion which is disposed along the front-rear direction of an upper edge of the airbag to supply the inflating gas to an upper side of the main inflation portion;
   the non-inflow portion is equipped with a peripheral portion disposed on a peripheral edge of the gas inflow portion, a closing portion which is disposed to regulate the thickness of the inflation portion of the gas inflow portion or partition the inflating site, and a plurality of mounting piece portions mounted to the upper edge of the window, wherein the mounting piece portions are disposed to extend upward on the upper edge of the airbag;
   a boundary closing portion as the closing portion is disposed between the main inflation portion and the end-side inflation portion of the airbag at the time of completion of inflation to partition the main inflation portion and the end-side inflation portion;
   the boundary closing portion is equipped with a vertical closing portion disposed along a substantially vertical direction on the lower side, and an inclined closing portion that extends in an obliquely upward direction of the main inflation portion from the vicinity of the upper end of the vertical closing portion, and
   the boundary closing portion defines an upper distribution port and a lower distribution port, which are configured to allow the inflating gas from the main inflation portion to flow to the end-side inflation portion, wherein the upper distribution port is located between the upper edge of the airbag and an upper end of the boundary closing portion, and the lower distribution port is located between a lower edge of the airbag and a lower end of the vertical closing portion.

2. The head protection airbag device according to claim 1, wherein the boundary closing portion of the airbag integrally and continuously disposes the vertical closing portion and the inclined closing portion.

3. The head protection airbag device according to claim 2, wherein the boundary closing portion of the airbag is configured to have a shape such that, as the edge of the main inflation portion, the edge of the vertical closing portion extends in a vertical direction and the edge of the inclined closing portion extends in the front-rear direction.

4. The head protection airbag device according to claim 1, wherein:
   the folded shape of the end-side inflation portion to the upper edge of the window in the airbag is set to a folded shape in a state in which a fold is provided in the vertical closing portion of the boundary closing portion or in the end-side inflation portion in the vicinity of the vertical closing portion, the end-side inflation portion is folded to the side of the vehicle inner wall portion of the main inflation portion, and the lower edge of the airbag is brought close to the upper edge;
   a mounting piece portion provided on the end portion of the end-side inflation portion on the upper edge of the airbag is disposed in a just upper area of the vertical closing portion, or near the boundary closing portion of the main inflation portion direction from the just upper area, so as to form the fold in the folded shape,
   the mounting piece portion is attachably disposed in a roof side rail portion of the vehicle;
   a vertical length dimension of the mounting piece portion is formed to be longer than other mounting piece portions; and
   the end-side inflation portion of the inflated airbag is disposed to cover the vehicle interior side of a pillar portion which extends from the roof side rail portion and is connected to the lower edge of the window.

5. The head protection airbag device according to claim 1, wherein:
   the airbag connects the side of the vehicle outer wall portion of the boundary closing portion and a pillar portion, which extends from the roof side rail portion and is connected to the lower edge of the window, to exert tension to the lower edge at the time of completion of inflation of the airbag along the front-rear direction; and
   the airbag includes a tension cloth configured to support the vehicle exterior side of the end-side inflation portion.

6. The head protection airbag device according to claim 1, wherein the end-side inflation portion, at the time of completion of inflation of the airbag, includes an extending portion which extends below a belt line of the lower edge of the window of the vehicle and is supported on the lower edge of the window.

7. The head protection airbag device according to claim 1, wherein the inclined closing portion extends into the main inflation portion from the upper end of the vertical closing portion.

8. The head protection airbag device according to claim 1, wherein the inclined closing portion extends away from the end-side inflation portion and into the main inflation portion from the upper end of the vertical closing portion.

9. The head protection airbag device according to claim 1, wherein the inclined closing portion extends in a rearward direction of the vehicle side surface.

\* \* \* \* \*